United States Patent
Lopez Leones et al.

(10) Patent No.: US 12,057,020 B2
(45) Date of Patent: Aug. 6, 2024

(54) SYSTEMS AND METHODS FOR PREDICTING FLIGHT DATA

(71) Applicant: THE BOEING COMPANY, Chicago, IL (US)

(72) Inventors: Javier Lopez Leones, Madrid (ES); Nicolas Pena Ortiz, Madrid (ES); Pablo Costas Alvarez, Madrid (ES); Pedro Cesar Alvarez Esteban, Valladolid (ES); Raul Andres Torres Diaz, Valladolid (ES); Alejandro Guemes, Madrid (ES)

(73) Assignee: THE BOEING COMPANY, Arlington, VA (US)

( * ) Notice: Subject to any disclaimer, the term of this patent is extended or adjusted under 35 U.S.C. 154(b) by 50 days.

(21) Appl. No.: 17/399,816

(22) Filed: Aug. 11, 2021

(65) Prior Publication Data
US 2022/0139232 A1    May 5, 2022

(30) Foreign Application Priority Data
Oct. 29, 2020    (EP) .................................... 20382941

(51) Int. Cl.
G08B 21/00    (2006.01)
G06N 5/04    (2023.01)
(Continued)

(52) U.S. Cl.
CPC .............. *G08G 5/0021* (2013.01); *G06N 5/04* (2013.01); *G06N 20/00* (2019.01);
(Continued)

(58) Field of Classification Search
CPC ...... G08G 5/0021; G08G 5/003; G08G 5/065; G08G 5/0013; G08G 5/0091; G06N 5/04;
(Continued)

(56) References Cited

U.S. PATENT DOCUMENTS

| | | |
|---|---|---|
| 9,396,663 B2 | 7/2016 | Zimmer et al. |
| 9,472,106 B2 | 10/2016 | Bailey et al. |

(Continued)

FOREIGN PATENT DOCUMENTS

| | | | | |
|---|---|---|---|---|
| CN | 104670508 A | 6/2015 | | |
| WO | WO-0062234 A1 * | 10/2000 | ........... | G08G 5/0043 |
| WO | 2002099769 | 12/2002 | | |

OTHER PUBLICATIONS

"All-causes delay to Air Transport in Europe for Oct. 2018" Eurocontrol, https://www.eurocontrol.int/publication/all-causes-delay-air-transport-europe-october-2018, Published Nov. 20, 2018, pp. 1-2.

(Continued)

*Primary Examiner* — Mark S Rushing
(74) *Attorney, Agent, or Firm* — Moore IP Law

(57) ABSTRACT

A method of flight data prediction for an aircraft includes receiving, at a device, arrival input data for a flight of the aircraft to an arrival airport. The arrival input data includes flight plans for a plurality of aircraft expected to arrive at or depart from the arrival airport during an arrival time range, predicted weather information for the arrival airport during the arrival time range, and facilities data for the arrival airport. The method includes generating, at the device based on the arrival input data, one or more arrival sets for the aircraft. Each arrival set comprising a predicted gate arrival time for the aircraft at an arrival gate using a particular runway and a probability associated with the aircraft using the particular runway. The method also includes generating, at the device, an output based on at least one of the one or more arrival sets.

20 Claims, 12 Drawing Sheets

(51) Int. Cl.
- *G06N 20/00* (2019.01)
- *G06Q 10/1093* (2023.01)
- *G06Q 50/30* (2012.01)
- *G08G 5/00* (2006.01)

(52) U.S. Cl.
CPC ......... *G06Q 10/1093* (2013.01); *G06Q 50/30* (2013.01); *G08G 5/003* (2013.01)

(58) Field of Classification Search
CPC .... G06N 20/00; G06Q 10/1093; G06Q 50/30; G06Q 10/063; G01C 23/00; B64D 2045/0075
USPC .......................................................... 340/971
See application file for complete search history.

(56) References Cited

U.S. PATENT DOCUMENTS

| | | | |
|---|---|---|---|
| 9,727,825 | B2 | 8/2017 | Cetinich et al. |
| 10,157,549 | B2 | 12/2018 | D'alto et al. |
| 2003/0036928 | A1* | 2/2003 | Kenigsberg ............ G06Q 10/02 705/14.27 |
| 2007/0124059 | A1 | 5/2007 | Barry et al. |
| 2010/0030401 | A1* | 2/2010 | Rogers ................ G08G 5/0039 701/3 |
| 2010/0045485 | A1* | 2/2010 | Dunsky ................ G08G 5/0013 340/945 |
| 2010/0185426 | A1 | 7/2010 | Ganesan et al. |
| 2010/0204909 | A1 | 8/2010 | Gayraud et al. |
| 2012/0245836 | A1* | 9/2012 | White ...................... G08G 5/06 701/120 |
| 2013/0001355 | A1 | 1/2013 | Cox et al. |
| 2014/0278036 | A1 | 9/2014 | Ince et al. |
| 2015/0148999 | A1 | 5/2015 | Mere et al. |
| 2015/0279218 | A1 | 10/2015 | Irrgang et al. |
| 2015/0317761 | A1* | 11/2015 | Lee ........................ G06Q 10/02 701/465 |
| 2016/0086396 | A1 | 3/2016 | Nutaro et al. |
| 2016/0240090 | A1* | 8/2016 | Marcella ................ G08G 5/065 |
| 2018/0012499 | A1* | 1/2018 | Madhusudan ....... G08G 5/0082 |
| 2019/0108758 | A1 | 4/2019 | Byravan et al. |
| 2019/0135452 | A1 | 5/2019 | Fuscone et al. |
| 2021/0133370 | A1* | 5/2021 | Sweet ..................... G06F 30/20 |
| 2021/0150921 | A1 | 5/2021 | Frontera et al. |
| 2022/0215760 | A1 | 7/2022 | Jorgensen et al. |

OTHER PUBLICATIONS

"Making the connection: the First Rotation Hours Optimisation Trial" Eurocontrol, https://www.eurocontrol.int/news/making-connection-first-rotation-hours-optimisation-trial, Published Jun. 21, 2018, pp. 1-3.

"The propagation of air transport delays in Europe" Eurocontrol, https://www.eurocontrol.int/publication/propagation-air-transport-delays-europe, Published Dec. 23, 2009, pp. 1-2.

Avery, Jacob et al., "Data-Driven Modeling and Prediction of the Process for Selecting Runway Configurations," Transporation Research Record: Journal of the Transportation Research Board, No. 2600, Transportation Board, 2016, pp. 1-11.

Avery, Jacob et al., "Predicting Airport Runway Configuration—A Discrete-Choice Modeling Approach," Thirteenth USA/Europe Air Traffic Managment Research and Development Seminar (ATM2015), Jun. 23-26, 2015, 11 pgs.

De Legee, Argen et al., "Probabilistic Runway and Capacity Forecasting using Machine Learning to Support Decision Making," SESAR, Nov. 8-10, 2016, pp. 1-8.

Dhanasekaran, Dakshina, "Improved Prediction of Runway Usage for Noise Forecast," Delft University of Technology, Thesis in partial fulfillment of the requirements for the degree of Master of Science in Aerospace Engineering, Aug. 29, 2015, 94 pgs.

Extended European Search Report dated Jun. 17, 2020 issued in the corresponding Application No. EP19383006, pp. 1-8.

Extended European Search Report for Application 20382941.1 dated Apr. 21, 2021, 10 pages.

Hesselink, H. H. et al., "Probabilistic 2-Day Forecast of Runway Use, Efficient and safe runway allocation based on weather forecast" National Aerospace Laboratory NLR, Ninth USA/Eruope Air Traffic Management Research and Decelopment Seminar (ATM2011), NLR-TP-2011-287. Oct. 2011, pp. 1-9.

Ithnan et al., "Aircraft Taxiing Strategy Optimization", Department Maritime & Transport Technology, Technology University of Delft, Mekelweg 2, 2628 CD Delft, the Netherlands, pp. 1-9.

Kern, Christian Strottmann et al., "Data-driven aircraft estimated time of arrival prediction," 2015 Annual IEEE Systems Conference (SYSCON) Proceedings, IEEE, Apr. 13, 2015, pp. 727-733.

Khadilkar, "Estimation of Aircraft Taxi-out Fuel Burn using Flight Data Recorder Archives", AIAA Guidance, Navigation, and Control Conference 2011, pp. 1-12.

Lee et al., "Taxi Time Prediction at Charlotte Airport Using Fast-Time Simulation and Machine Learning Techniques.", University of California, Santa Cruz, NASA Ames Research Center, Moffett Field, CA 94035, USA, pp. 1-11.

Ravizza et al., "Aircraft taxi time prediction: Comparisons and insights. Applied Soft Computing." (2014), pp. 397-406.

Eurocontrol Central Office for Delay Analysis (CODA), https://ansperformance.eu/capacity/tot_dly/, retrieved Apr. 21, 2023, 1 pg.

Decision of Rejection dated Feb. 3, 2024 issued in CN Application No. 202011083430.6, 14 pp. with English Translation, 7 pp.

Communication Pursuant to Article 94(3) EPC dated Feb. 7, 2024 issued in the corresponding Application No. EP19383006, pp. 1-5.

First Office Action and Search Report dated Jul. 22, 2023 issued in CN Application No. 202011083430.6, 17 pp. with English Translation, 13 pp.

Balakrishna, Poornima et al., "Estimating Taxi-Out Times with a Reinforcement Learning Algorithm," Dec. 9, 2008, IEEE, 2008 IEEE/AIM 27th Digital Avionics Systems Conference, pp. 3.D.3-1-3.D.3-12 (Year: 2008).

\* cited by examiner

SYSTEMS AND METHODS FOR PREDICTING FLIGHT DATA

FIELD OF THE DISCLOSURE

The present disclosure is generally related to flight data prediction.

BACKGROUND

Prior to a flight, an aircraft is loaded with fuel based on a fuel usage estimate. The fuel usage estimate is based on an expected duration of the flight and estimated taxi times. Taxi times can vary by airport and by runway-to-gate paths. For example, a longer runway-to-gate path can be associated with a longer taxi time. As another example, a busy runway at an airport can have a longer wait time for take-off and correspondingly a longer taxi time as compared to a runway that is rarely used. Pilots typically estimate a taxi time based on prior experience or a fixed taxi time average for an airport. The taxi time estimate based on prior experience or the fixed taxi time airport average does not account for real-time conditions or differences between runway-to-gate paths. To ensure that the aircraft is loaded with sufficient fuel for the flight, pilots add extra fuel to the fuel usage estimate. The extra fuel increases the weight of the aircraft, resulting in higher fuel consumption.

SUMMARY

In a particular implementation, a device for flight data prediction includes a memory, a communication interface, and one or more processors. The memory is configured to store a departure airport map. The communication interface is configured to receive location data for a plurality of aircraft expected to arrive at or depart from a departure airport during a particular time range. The one or more processors are configured to predict, based on the location data and the departure airport map, a taxi duration or a fuel usage of a first aircraft of the plurality of aircraft. The one or more processors are also configured to generate an output based on the taxi duration or the fuel usage.

In another particular implementation, a method for flight data prediction includes receiving, at a device, flight plans for a plurality of aircraft expected to arrive at or depart from an arrival airport during a particular time range. The method also includes predicting, based on the flight plans and an arrival airport map, a taxi duration or a fuel usage of a first aircraft of the plurality of aircraft. The method further includes generating, at the device, an output based on the taxi duration or the fuel usage.

In another particular implementation, a computer-readable storage device storing instructions that, when executed by one or more processors, cause the one or more processors to initiate, perform, or control operations to predict flight data. The operations include receiving flight plans for a plurality of aircraft expected to arrive at or depart from a departure airport during a particular time range. The operations also include predicting, based on the flight plans and a departure airport map, a taxi duration or a fuel usage of a first aircraft of the plurality of aircraft. The operations further include generating an output based on the taxi duration or the fuel usage.

The features, functions, and advantages described herein can be achieved independently in various implementations or may be combined in yet other implementations, further details of which can be found with reference to the following description and drawings.

DETAILED DESCRIPTION

Figure 1:
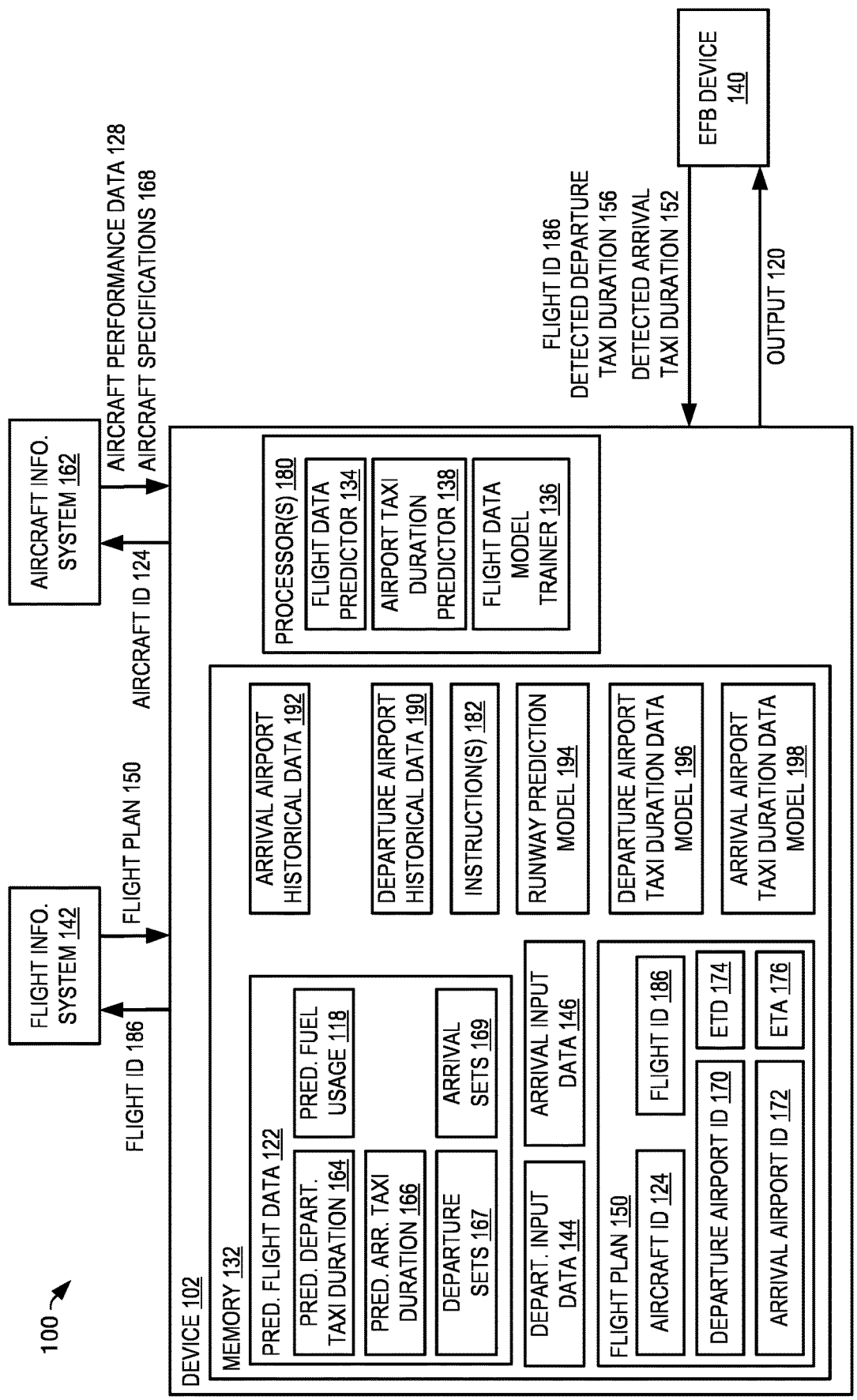
FIG. 1 is a diagram that illustrates a system configured to predict flight data.

Aspects disclosed herein present systems and methods for predicting flight data. A device uses an airport taxi duration data model to predict taxi duration for a flight at a particular airport. In a particular example, the device retrieves a flight plan associated with the flight. The flight plan indicates an expected departure time of a particular aircraft from a departure airport and an expected arrival time of the particular aircraft at an arrival airport.

In a particular aspect, the device uses a departure airport taxi duration data model to determine a predicted departure taxi time. For example, the device retrieves aircraft information of the particular aircraft, airport information of the departure airport, aircraft flight information of one or more first aircraft that are expected to arrive at or depart from the departure airport within a first time range of the expected departure time, weather conditions at the departure airport, weather forecast at the expected departure time for the departure airport, or a combination thereof. To illustrate, the aircraft information includes aircraft performance data, aircraft specifications, or a combination thereof, of the particular aircraft. The airport information includes a map of the departure airport, runway directions of the departure airport, or both. The aircraft flight information indicates gate assignments, runway assignments, or a combination thereof, at the departure airport of the one or more first aircraft that are expected to arrive at or depart from the departure airport within the first time range. In some examples, the aircraft flight information indicates locations of the one or more first aircraft. The departure airport taxi duration data model uses the retrieved information as departure input and outputs the predicted departure taxi time.

In another particular aspect, the device uses an arrival airport taxi duration data model to determine a predicted arrival taxi time. For example, the device retrieves aircraft information of the particular aircraft, airport information of the arrival airport, aircraft flight information of one or more second aircraft that are expected to arrive at or depart from the arrival airport within a second time range of the expected arrival time, weather conditions at the arrival airport, weather forecast at the expected arrival time for the arrival airport, or a combination thereof. The arrival airport taxi duration data model uses the retrieved information as arrival input and outputs the predicted arrival taxi time. The device predicts a fuel usage for the flight based at least in part on the predicted departure taxi time and the predicted arrival taxi time. The device outputs the predicted fuel usage to a display. The predicted fuel usage accounts for real-time conditions, runway-to-gate paths, or a combination thereof, and accordingly is a more reliable estimate of fuel usage of the particular aircraft. A more reliable estimate can reduce the amount of extra fuel that the particular aircraft carries for the flight, which can improve the fuel efficiency for the flight.

In some examples, the device can update (e.g., train) the departure airport taxi duration data model, the arrival airport taxi duration data model, or both, based on a comparison of predicted taxi times and detected taxi times. Training the data models based on the predicted taxi times and the detected taxi times helps maintain or improve prediction accuracy of the data models.

For example, the device receives a detected departure taxi time of the particular aircraft at the departure airport for the flight. The device trains the departure airport taxi duration data model based on departure input. The departure input is input used to determine the predicted departure taxi time, the predicted departure taxi time, and the detected departure taxi time. For example, the device determines an error measure based on a comparison of the predicted departure taxi time and the detected departure taxi time and updates the departure airport taxi duration data model based on the error measure. In a particular aspect, the departure airport taxi duration data model includes a neural network and the device updates weights of nodes of the neural network based on the error measure. The trained departure airport taxi duration data model can be used subsequently to predict taxi times for other flights departing from the departure airport.

As another example, the device receives a detected arrival taxi time of the particular aircraft at the arrival airport for the flight. The device trains the arrival airport taxi duration data model based on arrival input. The arrival input is input used to determine the predicted arrival taxi time, the predicted arrival taxi time, and the detected arrival taxi time. The trained arrival airport taxi duration data model can be used subsequently to predict taxi times for other flights arriving at the arrival airport. For example, the device determines an error measure based on a comparison of the predicted arrival taxi time and the detected arrival taxi time and updates the arrival airport taxi duration data model based on the error measure. In a particular aspect, the arrival airport taxi duration data model includes a neural network and the device updates weights of nodes of the neural network based on the error measure.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 180 in FIG. 1), which indicates that in some implementations the device 102 includes a single processor 180 and in other implementations the device 102 includes multiple processors 180. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to predict flight data. The system 100 includes a device 102 coupled to a flight information system 142, an aircraft information system 162, or both. In a particular example, the flight information system 142 includes one or more servers. In a particular example, the aircraft information system 162 includes one or more servers. The device 102 is also coupled to an electronic flight bag (EFB) device 140 (e.g., a tablet, a computer, a mobile device, or a combination thereof). In a particular aspect, the device 102 is coupled via a network to the electronic flight bag device 140. In a particular aspect, one or more operations described herein as performed by the device 102 are performed by one or more servers.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The device 102 includes a memory 132, one or more processors 180, or a combination thereof. The memory 132 includes a computer-readable medium (e.g., a computer-readable storage device) that stores instructions 182 that are executable by the processor 180. The instructions 182 are executable to initiate, perform or control operations to aid in flight data prediction.

The processor 180 includes a flight data predictor 134, an airport taxi duration predictor 138, a flight data model trainer 136, or a combination thereof, that can be implemented at least in part by the processor 180 executing the instructions 182. The processor 180 can be implemented as a single processor or as multiple processors, such as in a multi-core configuration, a multi-processor configuration, a distributed computing configuration, a cloud computing configuration, or any combination thereof. In some implementations, one or more portions of the flight data predictor 134, the airport taxi duration predictor 138, the flight data model trainer 136, or a combination thereof, are implemented by the processor 180 using dedicated hardware, firmware, or a combination thereof.

The flight data model trainer 136 is configured to train a runway prediction model 194, a departure airport taxi duration data model 196, and an arrival airport taxi duration data model 198 based, at least in part, on departure airport historical data 190 and arrival airport historical data 192. The runway prediction model 194, the departure airport taxi duration data model 196, the arrival airport taxi duration data model 198, or combinations thereof, include a neural network, a random forest, a gradient boosted decision tree, a machine learning model, a statistical model, or a combination thereof.

The runway prediction model 194 determines which runway or runways are most likely to be used at an airport during a particular time. A prediction of which runway or runways are likely to be used at the airport by the runway prediction model 194 is based on airport configuration data, weather data, information about other aircraft (e.g., from Automatic Dependent Surveillance-Broadcast (ADS-B) data, flight plan databases, Airport Collaborative Decision Making (A-CDM) databases, etc.), other input, or combinations thereof. In some implementations, output from the runway prediction model 194 is provided as input to each of the departure airport taxi duration data model 196 and the arrival airport taxi duration data model 198. In some implementations, and as described below with respect to FIG. 4, the runway prediction model 194 is accessible via a user interface 400 to provide a user (e.g., a pilot or dispatcher) with information about current active runways and weather information at a given airport along with predicted runways and weather forecasts for selectable time frames.

The airport taxi duration predictor 138 is configured to use an airport taxi duration data model to generate a predicted taxi duration, as further described with reference to FIG. 2. For example, the airport taxi duration predictor 138 is configured to provide departure input data 144 as input to the departure airport taxi duration data model 196. The departure airport taxi duration data model 196 generates a predicted departure taxi duration 164 responsive to the departure input data 144. As another example, the airport taxi duration predictor 138 is configured to provide arrival input data 146 as input to the arrival airport taxi duration data model 198. The arrival airport taxi duration data model 198 generates a predicted arrival taxi duration 166 responsive to the arrival input data 146.

The flight data predictor 134 is configured to generate predicted flight data 122. For example, the flight data predictor 134 is configured to generate a predicted fuel usage 118 based at least in part on the predicted departure taxi duration 164, the predicted arrival taxi duration 166, or both.

During operation, the device 102 receives a flight identifier 186 (e.g., an aviation information data exchange ("AIDX") flight identifier) from the EFB device 140. For example, a pilot accesses a fuel usage estimation application on the EFB device 140 and enters the flight identifier 186 (e.g., a carrier code, a flight number, and a date). The EFB device 140 sends the flight identifier 186 to the device 102. The flight identifier 186 identifies a scheduled flight of an aircraft.

The flight data predictor 134, in response to receiving the flight identifier 186 from the EFB device 140, requests a flight plan corresponding to the flight identifier 186 from the flight information system 142. The flight information system 142, in response to determining that a flight plan 150 is associated with the scheduled flight identified by the flight identifier 186, sends the flight plan 150 to the device 102.

The flight data predictor 134 determines that the flight plan 150 indicates that an aircraft (indicated by an aircraft identifier 124) is scheduled to depart from a departure airport (indicated by a departure airport identifier 170) at an expected time of departure (ETD 174). The flight data predictor 134 determines that the flight plan 150 indicates that the aircraft is scheduled to arrive at an arrival airport (indicated by an arrival airport identifier 172) at an expected time of arrival (ETA 176).

The flight data predictor 134 provides the flight plan 150 and the departure airport identifier 170 to the airport taxi duration predictor 138. The airport taxi duration predictor 138, in response to receiving the flight plan 150 and the departure airport identifier 170, generates the predicted departure taxi duration 164 based on the departure input data 144 and the departure airport taxi duration data model 196, as further described with reference to FIG. 2. The flight data predictor 134 provides the flight plan 150 and the arrival airport identifier 172 to the airport taxi duration predictor 138. The airport taxi duration predictor 138, in response to receiving the flight plan 150 and the arrival airport identifier 172, generates the predicted arrival taxi duration 166 based on the arrival input data 146 and the arrival airport taxi duration data model 198, as further described with reference to FIG. 2.

The flight data predictor 134 generates the predicted fuel usage 118 based at least in part on the predicted departure taxi duration 164, the predicted arrival taxi duration 166, or both. In a particular example, the flight data predictor 134, in response to determining that the flight plan 150 includes the aircraft identifier 124, sends an aircraft information request indicating the aircraft identifier 124 to the aircraft information system 162. The aircraft information system 162, in response to receiving the aircraft information request, sends aircraft specifications 168, aircraft performance data 128, or both, of the aircraft indicated by the aircraft identifier 124 to the device 102. The aircraft specifications 168 indicate information regarding components of the aircraft, such as a particular type of engine, a particular type of tires, a count of tires, a type of aircraft, or a combination thereof. The aircraft performance data 128 indicates historical data regarding fuel usage of the aircraft. For example, the aircraft performance data 128 includes historical data that indicates detected fuel usage during a taxi between a gate and a runway at a particular airport for a prior flight.

The flight data predictor 134 determines an average taxi fuel usage based on the aircraft performance data 128, the aircraft specifications 168, or both. For example, the flight data predictor 134 determines the average taxi fuel usage associated with the aircraft components indicated by the aircraft specifications 168. As another example, the flight data predictor 134 determines the average taxi fuel usage based on the historical taxi fuel usage data indicated by the aircraft performance data 128.

The flight data predictor 134 determines a predicted departure taxi fuel usage based on the predicted departure taxi duration 164 and the average taxi fuel usage (e.g., the predicted departure taxi fuel usage equals the predicted departure taxi duration 164 multiplied by the average taxi fuel usage). The flight data predictor 134 determines a predicted arrival taxi fuel usage based on the predicted arrival taxi duration 166 and the average taxi fuel usage (e.g., the predicted arrival taxi fuel usage equals the predicted arrival taxi duration 166 multiplied by the average taxi fuel usage).

The flight data predictor 134 determines predicted flight fuel usage between taking off at the departure airport and landing at the arrival airport. For example, the aircraft performance data 128 includes historical data that indicates detected fuel usage between taking off at the departure airport and landing at the arrival airport for a prior flight. The flight data predictor 134 determines the predicted flight fuel usage based on the historical flight fuel usage data indicated by the aircraft performance data 128.

The flight data predictor 134 determines the predicted fuel usage 118 based on the predicted departure taxi fuel usage, the predicted arrival taxi fuel usage, the predicted flight fuel usage, or a combination thereof (e.g., the predicted fuel usage 118 equals the predicted departure taxi fuel usage plus the predicted arrival taxi fuel usage plus the predicted flight fuel usage).

The flight data predictor 134 generates an output 120 based on the predicted flight data 122. For example, the output 120 indicates an amount of fuel recommended to be loaded on the aircraft where the amount of fuel is based on the predicted fuel usage 118. In a particular aspect, the amount of fuel is equal to the predicted fuel usage 118. In another aspect, the amount of fuel is based on the predicted fuel usage 118 and a predetermined extra amount of fuel to account for unexpected events (e.g., the amount of fuel equals the predicted fuel usage 118 plus the predetermined extra amount of fuel). The flight data predictor 134 provides the output 120 to the EFB device 140.

In a particular aspect, the EFB device 140 provides the output 120 to a display. A pilot or other crew member can use the amount of fuel indicated by the output 120 as guidance for fueling the aircraft prior to the flight.

In some implementations, the flight data predictor determines one or more departure sets 167 and one or more arrival sets 169 and stores the one or more departure sets 167 and the one or more arrival sets 169 in the memory 132. Each departure set 167 includes at least an estimated time when the aircraft leaves a gate, an estimate of a runway that the aircraft will use, a probability associated with usage of the runway, an estimated taxi time to the runway, and an estimated time of takeoff from the runway. Each arrival set 169 includes at least a predicted gate arrival time for the aircraft at an arrival gate using a particular runway and a probability associated with the aircraft using the particular runway. Each arrival set can also include an estimated taxi time from the runway to the gate. The one or more departure sets, the one or more arrival sets, or both, can be used as data for generating information about the flight and for generating information about subsequent scheduled flights of the aircraft.

The flight data model trainer 136 uses various model training techniques to update the runway prediction model 194, the departure airport taxi duration data model 196, and the arrival airport taxi duration data model 198. In a particular implementation, the runway prediction model 194 updates to the runway prediction model 194 are based on a predicted runways for a time and conditions used to generate the prediction and actual runways used at the time and conditions at the time. In another implementation, airport taxi duration data models are updated based on a predicted taxi duration and a detected taxi duration. The predicted taxi duration is determined using the airport taxi duration model prior to a flight and the detected taxi duration indicates an actual taxi duration during the flight. In a particular example, the EFB device 140 retrieves the detected departure taxi duration 156, the detected arrival taxi duration 152, or both, from a flight data recorder of the aircraft, and forwards the retrieved information to the device 102. The flight data model trainer 136, in response to receiving the detected departure taxi duration 156, updates the departure airport taxi duration data model 196 based on the departure input data 144, the predicted departure taxi duration 164, the detected departure taxi duration 156, or a combination thereof. For example, the flight data model trainer 136 updates the departure airport taxi duration data model 196 to reduce a difference between a predicted departure taxi duration and a detected taxi duration for the same input data. In a particular implementation, the departure airport taxi duration data model 196 includes a neural network. In this implementation, the flight data model trainer 136 determines an error measure based on a comparison of the predicted departure taxi duration 164 and the detected departure taxi duration 156. The flight data model trainer 136 updates the departure airport taxi duration data model 196 by updating weights of nodes of the neural network based on the error measure.

In a particular aspect, the flight data model trainer 136 performs variable filtering prior to updating the runway prediction model 194, an airport taxi duration data model (e.g., the departure airport taxi duration data model 196 or the arrival airport taxi duration data model 198), or both. For example, the flight data model trainer 136, in response to determining that a detected taxi duration (e.g., the detected departure taxi duration 156 or the detected arrival taxi duration 152) corresponds to an outlier, reduces an influence of (e.g., disregards or adjusts) the detected taxi duration for training the airport taxi duration data model. In a particular aspect, the flight data model trainer 136 determines that the detected taxi duration corresponds to an outlier in response to determining that a difference between the detected taxi duration and the corresponding predicted taxi duration (e.g., the predicted departure taxi duration 164 or the predicted arrival taxi duration 166) is greater than a threshold. As another example, the flight data model trainer 136 determines that the detected taxi duration corresponds to an outlier in response to determining that at least a portion of the input data (e.g., the departure input data 144 or the arrival input data 146) is atypical. Reducing the influence of the detected taxi duration prevents the airport taxi duration data model from being skewed by an outlier.

In a particular implementation, the flight data model trainer 136, in response to determining that an error measure (e.g., a difference between a predicted taxi duration and a detected taxi duration) is less than a threshold, refrains from updating an airport taxi duration data model (e.g., the departure airport taxi duration data model 196 or the arrival airport taxi duration data model 198) based on the detected taxi duration (e.g., the detected departure taxi duration 156 or the detected arrival taxi duration 152). The flight data model trainer 136 may conserve resources (e.g., computational resources and time) by refraining from updating the airport taxi duration data model based on a detected taxi duration that is relatively close to the predicted taxi duration (e.g., the predicted departure taxi duration 164 or the predicted arrival taxi duration 166).

The flight data model trainer 136, in response to receiving the detected arrival taxi duration 152, updates the arrival airport taxi duration data model 198 based on the arrival input data 146, the predicted arrival taxi duration 166, the detected arrival taxi duration 152, or a combination thereof. For example, the flight data model trainer 136 updates the arrival airport taxi duration data model 198 to reduce a difference between a predicted arrival taxi duration and a detected taxi duration for the same input data. Updating the airport taxi duration data models based on detected taxi durations maintains or improves prediction accuracy of the airport taxi duration predictor 138.

Figure 2:
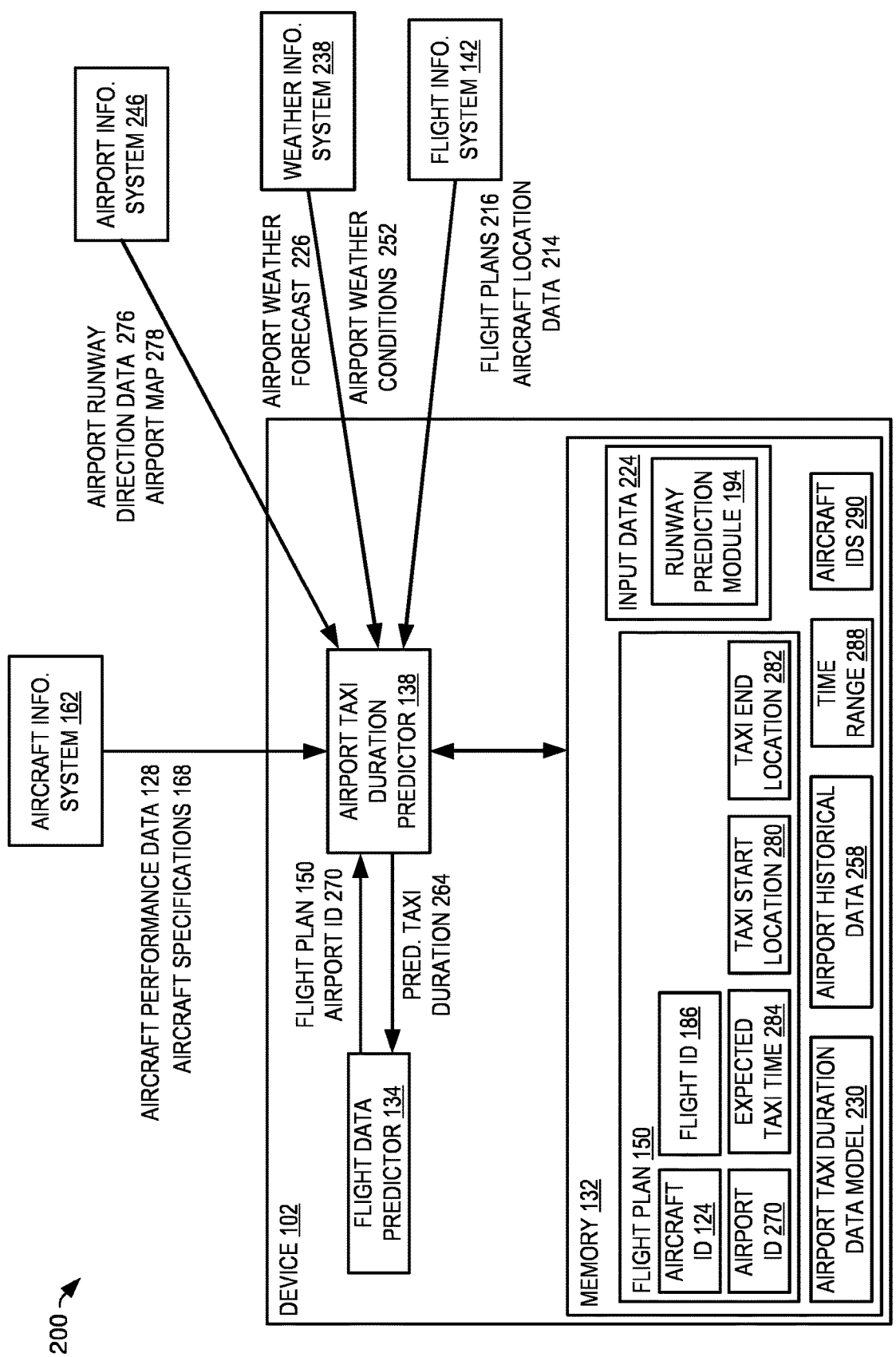
FIG. 2 is a diagram of an example of a system configured to predict a taxi duration.

Referring to FIG. 2, an example of a system 200 that is configured to predict a taxi duration is shown. In a particular aspect, one or more components of the system 200 are included in the system 100 of FIG. 1.

The device 102 is coupled to an airport information system 246, a weather information system 238, or both. In a particular aspect, the airport information system 246 includes one or more servers. In a particular aspect, the weather information system 238 includes one or more servers.

During operation, the airport taxi duration predictor 138 receives the flight plan 150 and an airport identifier 270 (e.g., the departure airport identifier 170 or the arrival airport identifier 172 of FIG. 1) from the flight data predictor 134. In a particular aspect, the airport taxi duration predictor 138, in response to receiving the airport identifier 270, retrieves a runway prediction module 194 and an airport taxi duration data model 230 for the airport identifier 270 from a data storage. In a particular aspect, multiple taxi data models, such as a departure taxi data model and an arrival taxi data model, are associated with the airport identifier 270. In this aspect, the airport taxi duration predictor 138, in response to determining that the airport identifier 270 matches the departure airport identifier 170 of FIG. 1 indicated in the flight plan 150, retrieves the departure taxi data model as the airport taxi duration data model 230. Alternatively, the airport taxi duration predictor 138, in response to determining that the airport identifier 270 matches the arrival airport identifier 172 of FIG. 1 indicated in the flight plan 150, retrieves the arrival taxi data model as the airport taxi duration data model 230.

The flight plan 150 indicates an expected taxi time 284, a taxi start location 280, a taxi end location 282, or a combination thereof. In a particular example, if the airport identifier 270 matches the departure airport identifier 170, the expected taxi time 284, the taxi start location 280, and the taxi end location 282 correspond to the expected time of departure 174, a departure gate, and a departure runway, respectively. Alternatively, if the airport identifier 270 matches the arrival airport identifier 172, the expected taxi time 284, the taxi start location 280, and the taxi end location 282 correspond to the expected time of arrival 176, an arrival runway, and an arrival gate, respectively.

The airport taxi duration predictor 138 determines a time range 288 based on the expected taxi time 284. In a particular example, other aircraft expected to arrive at or depart from the airport during the time range 288 could impact the expected taxi time 284 for the aircraft (indicated by the aircraft identifier 124). To illustrate, one or more aircraft that are expected to arrive at or depart from the airport up to a first time (e.g., 15 minutes) prior to the expected taxi time 284 could be using at least a portion of a first runway-to-gate path so that the portion of the first runway-to-gate path is likely to be unavailable for use by the aircraft (indicated by the aircraft identifier 124). Similarly one or more aircraft that are expected to arrive at or depart from the airport up to a second time (e.g., 30 minutes) subsequent to the expected taxi time 284 could be using at least a portion of a second runway-to-gate path so that the portion of the second runway-to-gate path is likely to be unavailable for use by the aircraft (indicated by the aircraft identifier 124). The expected taxi time 284 of the aircraft (indicated by the aircraft identifier 124) is affected if the aircraft is to wait for the portion of the first runway-to-gate path, the portion of the second runway-to-gate path, or both, to be available or if the aircraft is to use a another runway-to-gate path. The time range 288 is from the first time (e.g., 15 minutes prior to the expected taxi time 284) to the second time (e.g., 30 minutes subsequent to the expected taxi time 284).

The airport taxi duration predictor 138 generates input data 224 for the airport taxi duration data model 230. The input data 224 is based on expected input variables associated with the airport taxi duration data model 230. For example, the input data includes output from the runway prediction module 194 that identifies the most likely runway to be used by the aircraft. As another example, the airport taxi duration predictor 138 retrieves (e.g., requests), from the airport information system 246, airport runway direction data 276, an airport map 278, or a combination thereof, for the airport indicated by the airport identifier 270. In a particular aspect, the airport runway direction data 276 indicates expected runway directions of the airport during the time range 288. The airport map 278 indicates gates, runways, and paths (e.g., taxiways) between the gates and runways of the airport. In a particular aspect, the airport map 278 indicates availability of gates, runways, and paths. In a particular example, the airport map 278 indicates that a path is unavailable due to repairs. In a particular example, the airport map 278 indicates a parking stand area of the airport. In a particular aspect, the input data 224 includes the airport runway direction data 276, the airport map 278, or a combination thereof. In a particular aspect, the airport taxi duration predictor 138 receives the airport map 278 from an aerodrome mapping database.

In a particular example, the airport taxi duration predictor 138 retrieves (e.g., requests), at a first time from the weather information system 238, an airport weather forecast 226 for the time range 288 at the airport indicated by the airport identifier 270, airport weather conditions 252 at the first time at the airport, or both. In a particular aspect, the airport weather conditions 252 indicate the most recently detected weather conditions prior to the first time. In a particular aspect, the airport weather conditions 252 indicate weather conditions detected at the airport within a threshold duration of the first time (e.g., up to 3 hours prior to the first time). In a particular aspect, the input data 224 includes the airport weather forecast 226, the airport weather conditions 252, or a combination thereof.

In a particular example, the airport taxi duration predictor 138 retrieves (e.g., requests), from the flight information system 142, flight plans 216 of a plurality of aircraft (e.g., indicated by aircraft identifiers 290) that are expected to depart from or arrive at the airport indicated by the airport identifier 270 during the time range 288. In a particular aspect, the input data 224 includes the flight plans 216. In a particular aspect, the plurality of aircraft includes the aircraft indicated by the aircraft identifier 124.

In a particular example, the airport taxi duration predictor 138 retrieves (e.g., requests), at a first time from the flight information system 142, aircraft location data 214 indicating locations of the plurality of aircraft (e.g., indicated by aircraft identifiers 290) detected at the first time. In a particular aspect, the aircraft location data 214 indicates the most recently detected locations of the plurality of aircraft (e.g., indicated by aircraft identifiers 290) prior to the first time. In a particular aspect, the aircraft location data 214 indicates locations of the plurality of aircraft (e.g., indicated by aircraft identifiers 290) detected within a threshold duration of the first time (e.g., up to 1 hour prior to the first time). For example, the airport taxi duration predictor 138 receives the aircraft location data 214 at a particular time (e.g., 8:00 AM) indicating that a first aircraft of the plurality of aircraft (e.g., indicated by aircraft identifiers 290) was most recently detected at a first location at a first time (e.g., 7:30 AM) and that a second aircraft of the plurality of aircraft was most recently detected at a second location at a second time (e.g., 7:58 AM). In a particular aspect, the airport taxi duration predictor 138 receives the aircraft location data 214 from an automatic dependent surveillance broadcast system, an airport surface detection equipment model X system, or both. In a particular aspect, the input data 224 includes the aircraft location data 214. In a particular aspect, the input data 224 includes the aircraft performance data 128, the aircraft specifications 168, or a combination thereof.

The airport taxi duration predictor 138 provides the input data 224 as input to the airport taxi duration data model 230 to generate a predicted taxi duration 264. In examples where the airport identifier 270 matches the departure airport identifier 170 of FIG. 1, the predicted taxi duration 264 corresponds to the predicted departure taxi duration 164. In examples where the airport identifier 270 matches the arrival airport identifier 172 of FIG. 1, the predicted taxi duration 264 corresponds to the predicted arrival taxi duration 166.

In a particular aspect, the airport taxi duration predictor 138 generates airport historical data 258 of the airport (indicated by the airport identifier 270) to indicate that the predicted taxi duration 264 associated with the flight identifier 186 was generated for the input data 224. For example, the airport taxi duration predictor 138, in response to determining that the airport identifier 270 matches the departure airport identifier 170 of FIG. 1, updates the departure airport historical data 190 to include the input data 224, the predicted departure taxi duration 164, or both, associated with the flight identifier 186. Alternatively, the airport taxi duration predictor 138, in response to determining that the airport identifier 270 matches the arrival airport identifier 172 of FIG. 1, updates the arrival airport historical data 192 to include the input data 224, the predicted arrival taxi duration 166, or both, associated with the flight identifier 186. In a particular aspect, the airport historical data 258 is used to update (e.g., train) the airport taxi duration data model 230, as described herein.

The flight data predictor 134 of FIG. 1, in response to receiving a detected taxi duration at the airport (indicated by the airport identifier 270) for the flight (indicated by the flight identifier 186), updates the airport historical data 258 to indicate that the input data 224, the predicted taxi duration 264, or a combination thereof, are associated with the detected taxi duration. In a particular aspect, the flight data model trainer 136 trains the airport taxi duration data model 230 based on the airport historical data 258 (e.g., the input data 224, the predicted taxi duration 264, the detected taxi duration, or a combination thereof), as described with reference to FIG. 1.

The airport taxi duration predictor 138 generates the predicted taxi duration 264 based on real-time, or substantially real-time, data (e.g., the input data 224). The predicted taxi duration 264 is based on runway-to-gate paths indicated by the airport map 278. The predicted taxi duration 264 is a more accurate measure of actual taxi duration as compared to prior experience or a fixed taxi time average for an airport.

Figure 3:
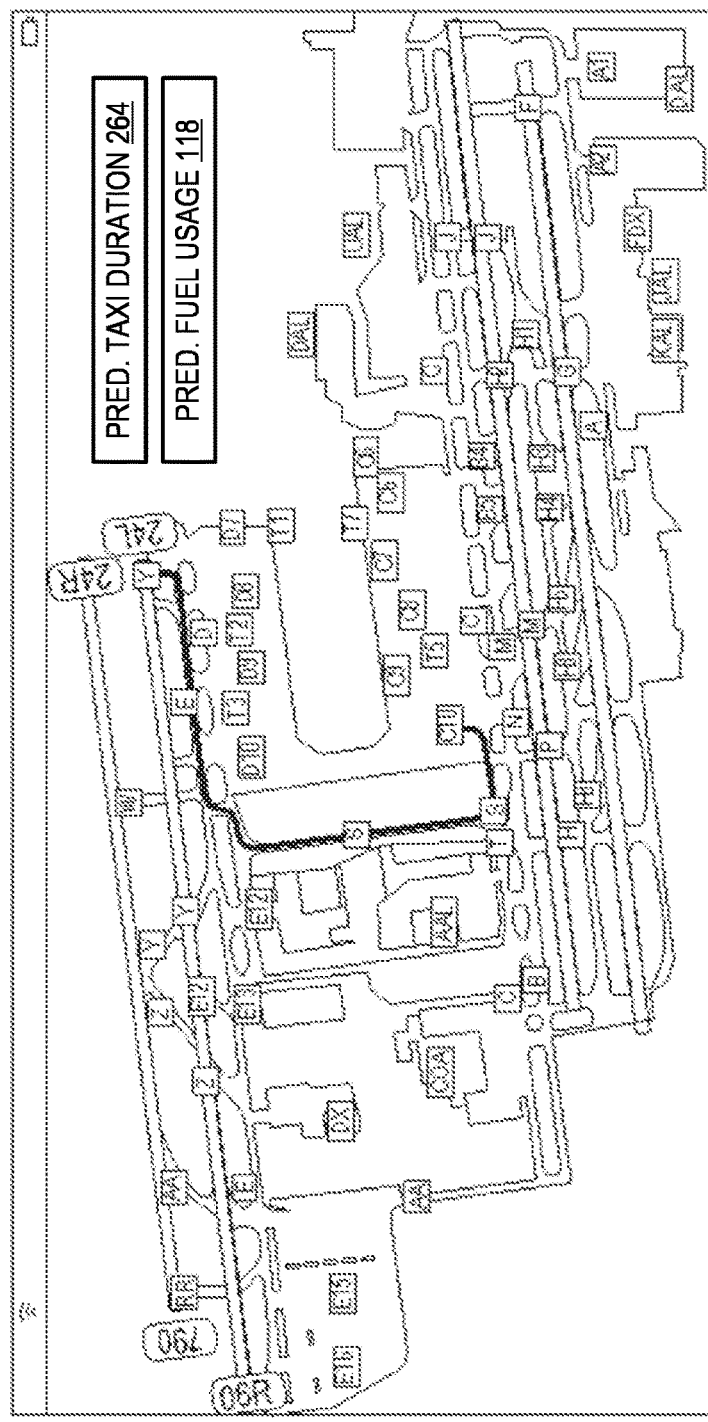
FIG. 3 is a diagram of an example of a user interface of a system configured to predict flight data.

Referring to FIG. 3, an example of a user interface is shown and generally designated 300. In a particular aspect, the user interface 300 is generated by the flight data predictor 134. For example, the output 120 includes the user interface 300. In a particular aspect, the user interface 300 is generated by the electronic flight bag device 140.

The user interface 300 indicates the predicted taxi duration 264 (e.g., the predicted departure taxi duration 164 or the predicted arrival taxi duration 166 of FIG. 1) for a runway-to-gate path (e.g., between C10 and 24L) at an airport (indicated by the airport identifier 270 of FIG. 1) for a flight. In a particular aspect, the user interface 300 indicates the predicted fuel usage 118 for the flight (indicated by the flight identifier 186 of FIG. 1). The user interface 300 thus provides a visual representation to a user (e.g., the pilot) of the predicted flight data 122.

Figure 4:
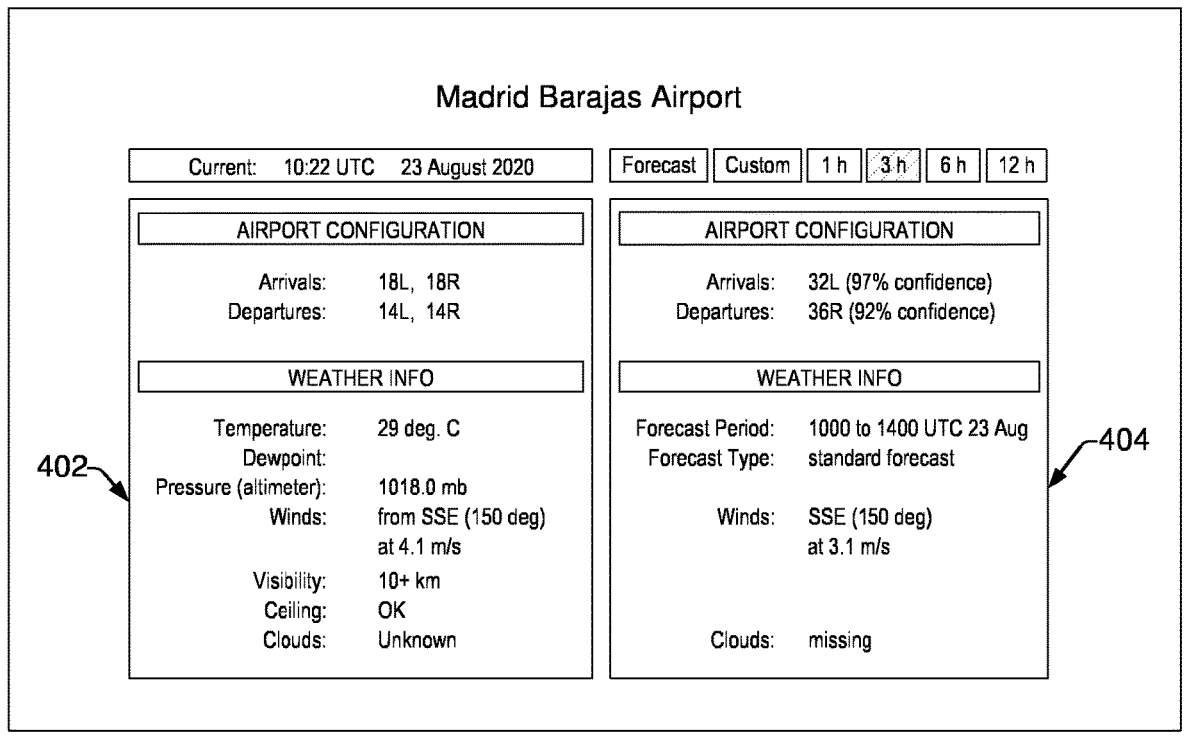
FIG. 4 is a diagram of an example of a user interface of a system configured to predict flight data, where the user interface presents current and predicted runway information and weather information for a particular airport.

Referring to FIG. 4, an example of a user interface for data generated by the runway prediction module 194 is shown and generally designated 400. In a particular aspect, the user interface 400 is generated by the flight data predictor 134. For example, the output 120 includes the user interface 400. In a particular aspect, the user interface 400 is generated by the EFB device 140.

The user interface 400 indicates current conditions 402 and predicted conditions 404 for a particular airport, which is the Madrid Barajas Airport in FIG. 4. A user can select a particular forecast time from preset time intervals (e.g., 1 hour, 3 hours, 6 hours, or 12 hours as depicted in FIG. 4) or can set a custom time by selecting a selectable custom option. In some implementations, the user interface 400 further includes a map showing one or more runways of the particular airport. The map can be associated with selectable options for showing trajectory, showing current runways, and showing forecast runways. The user can zoom in or out of the map using zoom controls.

Figure 5:
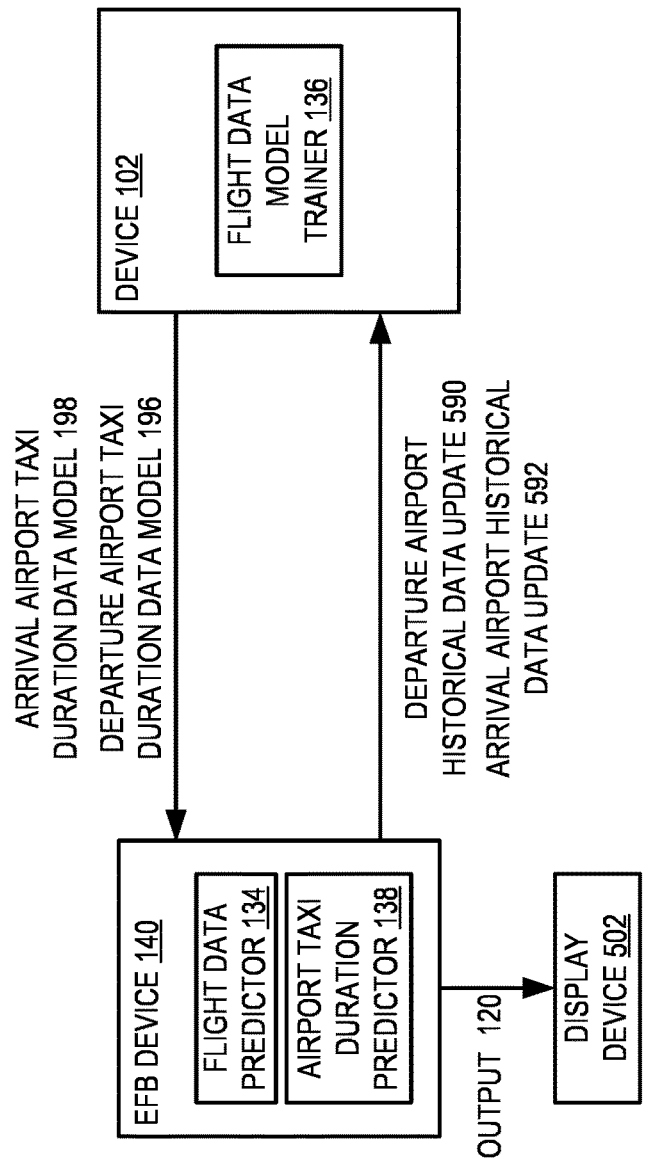
FIG. 5 is a diagram of another example of a system configured to predict flight data.

Referring to FIG. 5, a system operable to predict flight data is shown and generally designated 500. In FIG. 5, the device 102 includes the flight data model trainer 136, and the EFB device 140 includes the flight data predictor 134, the airport taxi duration predictor 138, or both.

In FIG. 5, the device 102 can train airport taxi duration data models of various airports and can provide one or more of the airport taxi duration data models to an EFB device 140. The EFB device 140 can locally determine predicted taxi durations and predicted fuel usage and provide airport historical data updates to the device 102. During operation, the EFB device 140 receives the departure airport taxi duration data model 196, the arrival airport taxi duration data model 198, or both, from the device 102. The flight data predictor 134 generates the output 120, as described with reference to FIG. 1, and provides the output 120 to a display device 502.

In a particular aspect, the flight data predictor 134 provides a departure airport historical data update 590, an arrival airport historical data update 592, or both, to the device 102. For example, the departure airport historical data update 590 includes the departure input data 144, the predicted departure taxi duration 164, the detected departure taxi duration 156 of FIG. 1, or a combination thereof. As another example, the arrival airport historical data update 592 includes the arrival input data 146, the predicted arrival taxi duration 166, the detected arrival taxi duration 152, or a combination thereof.

The flight data model trainer 136 updates the departure airport taxi duration data model 196 and the arrival airport taxi duration data model 198 based on the departure airport historical data update 590 and the arrival airport historical data update 592, respectively, as described with respect to FIG. 1.

The system 500 enables the device 102 to train airport taxi duration data models of various airports. The device 102 can provide the airport taxi duration data model to multiple EFB devices 140. Each EFB device 140 can locally determine predicted taxi durations and predicted fuel usage and provide airport historical data updates to the device 102. The device 102 can update the airport taxi duration data models based on airport historical data updates received from multiple EFB devices 140.

Figure 6:
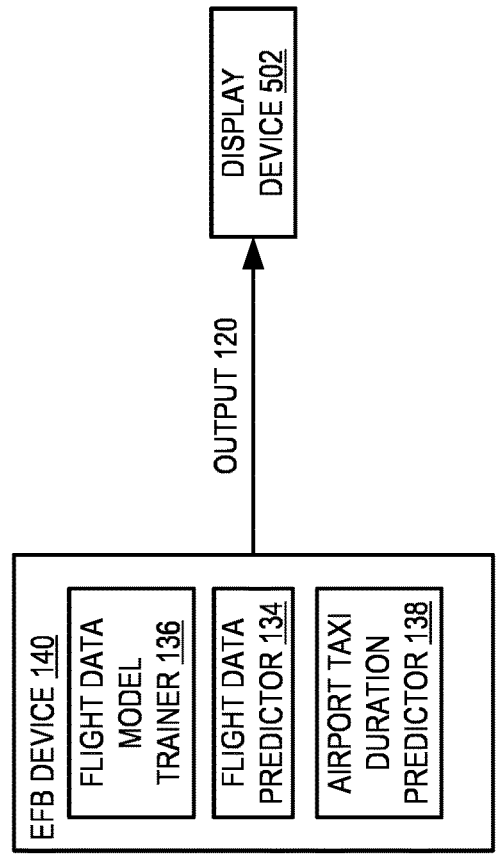
FIG. 6 is a diagram of another example of a system configured to predict flight data.

Referring to FIG. 6, a system operable to predict flight data is shown and generally designated 600. In FIG. 6, the EFB device 140 includes the flight data predictor 134, the airport taxi duration predictor 138, the flight data model trainer 136, or a combination thereof.

The EFB device 140 can locally generate predicted flight data and can locally update airport taxi duration data models. In a particular example, the flight data predictor 134 generates the output 120, as described with reference to FIG. 1, and provides the output 120 to a display device 502. The flight data model trainer 136 updates the departure airport taxi duration data model 196 and the arrival airport taxi duration data model 198, as described with respect to FIG. 1. The system 600 thus enables the EFB device 140 to locally train airport taxi duration data models of various airports. Each EFB device 140 can locally determine predicted taxi durations and predicted fuel usage and can locally update the airport taxi duration data models.

Figure 7:
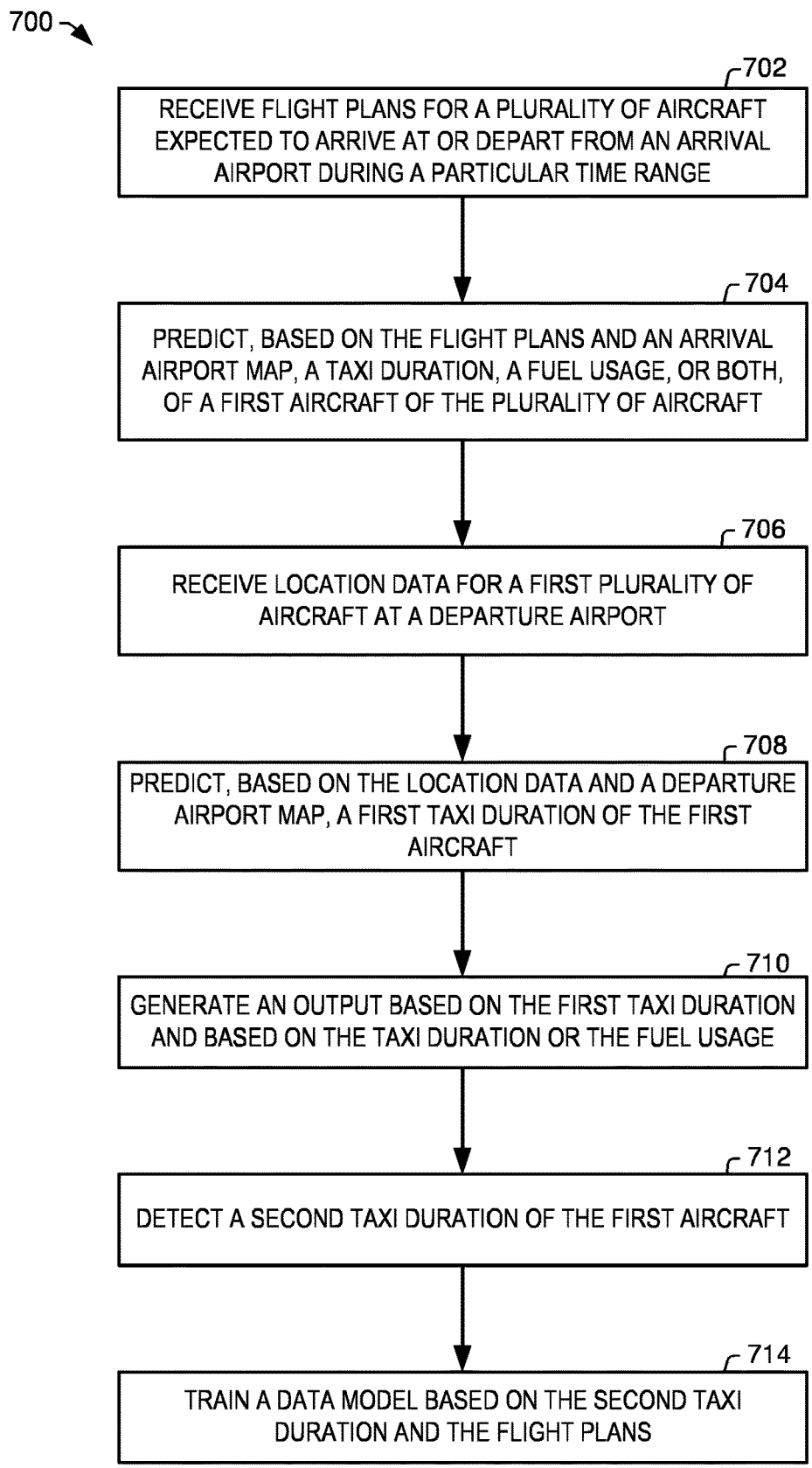
FIG. 7 is a diagram that illustrates a flow chart of an example of a method of flight data prediction.

FIG. 7 illustrates a method 700 of flight data prediction. In a particular aspect, one or more operations of the method 700 are performed by the flight data predictor 134, the airport taxi duration predictor 138, the processor 180, the device 102, the EFB device 140, the system 100 of FIG. 1, the system 200 of FIG. 2, the system 500 of FIG. 5, the system 600 of FIG. 6, or a combination thereof.

The method 700 includes receiving first flight plans and first location data for a first plurality of aircraft expected to arrive at or depart from an arrival airport during a particular time range, at 702. For example, the airport taxi duration predictor 138 of FIG. 1 receives the flight plans 216 for a first plurality of aircraft (indicated by the aircraft identifiers 290) expected to arrive at or depart from an airport (indicated by the arrival airport identifier 172) during the time range 288, as described with reference to FIG. 2.

The method 700 also includes predicting, based on the first flight plans and an arrival airport map, a first predicted taxi duration, a first predicted fuel usage, or both, of a first aircraft of the first plurality of aircraft, at 704. For example, the airport taxi duration predictor 138 of FIG. 1 determines the first predicted taxi duration 264 (e.g., the predicted arrival taxi duration 166) based on the flight plans 216 and the airport map 278, as described with reference to FIG. 2. The flight data predictor 134 of FIG. 1 determines the predicted fuel usage 118 based at least in part on the predicted arrival taxi duration 166, as described with reference to FIG. 1.

The method 700 further includes receiving second flight plans and second location data for a second plurality of aircraft at a departure airport, at 706. For example, the airport taxi duration predictor 138 of FIG. 1 receives the second location data 214 for a second plurality of aircraft (indicated by the aircraft identifiers 290) at the departure airport (e.g., indicated by the departure airport identifier 170), as described with reference to FIG. 2.

The method 700 also includes predicting, based on the location data and a departure airport map, a second predicted taxi duration of the first aircraft, at 708. For example, the airport taxi duration predictor 138 of FIG. 1 determines the second predicted taxi duration 264 (e.g., the predicted departure taxi duration 164) based on the second location data 214 and the airport map 278, as described with reference to FIG. 2.

The method 700 further includes generating an output based on the first taxi duration and based on the taxi duration or the fuel usage, at 710. For example, the flight data predictor 134 of FIG. 1 generates the output 120 based on the predicted departure taxi duration 164, the predicted fuel usage 118, the predicted arrival taxi duration 166, or a combination thereof, as described with reference to FIG. 1.

The method 700 also includes detecting a second taxi duration of the first aircraft, at 712. For example, the flight data model trainer 136 of FIG. 1 receives the detected departure taxi duration 156, as described with reference to FIG. 1. As another example, the flight data model trainer 136 of FIG. 1 receives the detected arrival taxi duration 152, as described with reference to FIG. 1.

The method 700 further includes training a data model based on the second taxi duration and the flight plans, at 714. For example, the flight data model trainer 136 of FIG. 1 trains the departure airport taxi duration data model 196 based on the detected departure taxi duration 156, as described with reference to FIG. 1. As another example, the flight data model trainer 136 of FIG. 1 trains the arrival airport taxi duration data model 198 based on the detected arrival taxi duration 152, as described with reference to FIG. 1.

The method 700 thus enables determination of the predicted fuel usage 118, the predicted arrival taxi duration 166, the predicted departure taxi duration 164, or a combination thereof, based on real-time data (e.g., the flight plans 216, the airport map 278, and the aircraft location data 214). The predicted departure taxi duration 164, the predicted arrival taxi duration 166, and the predicted fuel usage 118 are more accurate measures of actual taxi duration and actual fuel usage, respectively, as compared to pilot experience or fixed average values for an airport.

Although, the method 700 includes the element 706 and the element 708, in other implementations one or more elements of the method 700 are omitted. As an example, in some implementations, the method 700 omits the element 706 and the element 708, and the output 120 is based on the predicted fuel usage 118 or the predicted arrival taxi duration 166 (and not the predicted departure taxi duration 164). As another example, in some implementations, the method 700 omits the element 712 and the element 714. In some implementations, the method 700 includes the element 702, the element 704, and the element 710, and the output 120 is based on the predicted fuel usage 118 or the predicted arrival taxi duration 166 (and not the predicted departure taxi duration 164).

Figure 8:
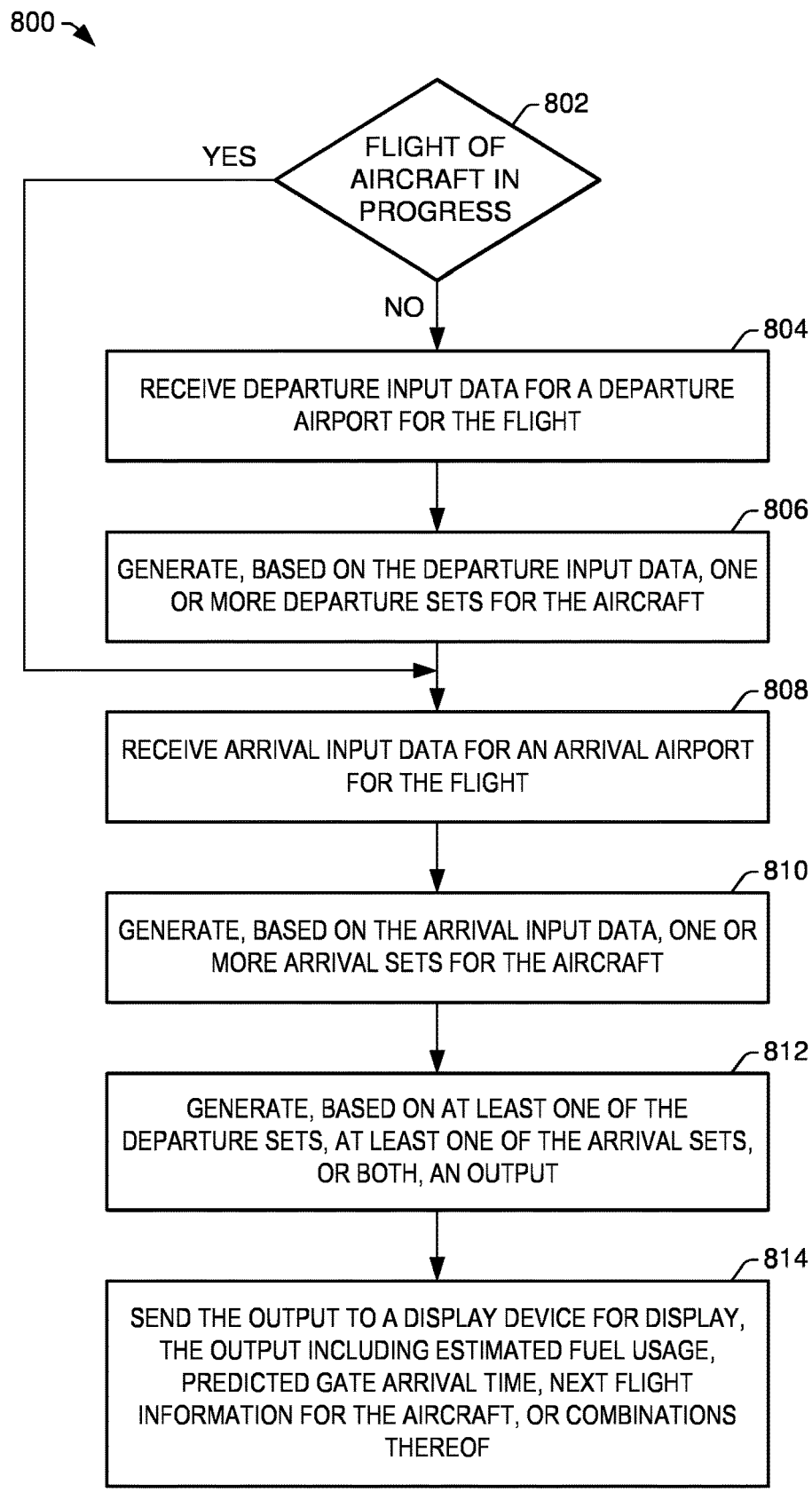
FIG. 8 is a diagram that illustrates a flow chart of an example of a method of flight data prediction.

FIG. 8 illustrates a method 800 of flight data prediction for a flight of an aircraft. In a particular aspect, one or more operations of the method 800 are performed by the flight data predictor 134, the airport taxi duration predictor 138, the processor 180, the device 102, the EFB device 140, the system 100 of FIG. 1, the system 200 of FIG. 2, the system 500 of FIG. 5, the system 600 of FIG. 6, or a combination thereof.

The method 800 includes determining whether the flight by the aircraft is in progress, at 802. When the flight is not in progress, at 802, the method 800 includes receiving departure input data for departure of the aircraft from a departure airport, at 804. The departure input data includes at least flight plans for a first plurality of aircraft expected to arrive at or depart from the departure airport during a departure time range, predicted weather information for the departure airport during the departure time range, and facilities data for the departure airport. For example, the airport taxi duration predictor 138 of FIG. 1 receives flight plans 216 for a first plurality of aircraft (indicated by the aircraft identifiers 290) at the departure airport (e.g., indicated by the departure airport identifier 170), as described with reference to FIG. 2.

The method 800 includes generating, based on the departure input data, one or more departure sets for the aircraft, at 806. Each departure set includes at least an estimated time when the aircraft leaves a gate, an estimate of a runway that the aircraft will use, a probability associated with usage of the runway, an estimated taxi time to the runway, and an estimated time of takeoff from the runway. In particular implementations, one particular departure set selected for future use includes a departure set with a probability associated with runway usage above a threshold (e.g., above a 7% chance of use) and having a longest estimated taxi time. Using the particular departure set for further calculations (e.g., calculating estimated fuel usage), provides a conservative estimate of calculated values (e.g., the estimated fuel usage) as compared to using a departure set with a shorter estimated taxi time but with a higher probability associated with runway usage. One or more other departure sets can also be selected for further use.

Actual departure data for the flight is collected. The actual departure data for the flight together with one or more of the departure sets can be used as training data for the flight data model trainer 136 of FIG. 1.

When the aircraft is in flight, at 802, or after generating the one or more departure sets, at 806, the method 800 includes receiving arrival input data for an arrival airport for the flight, at 808. The arrival input data includes at least flight plans for a second plurality of aircraft expected to arrive at or depart from the arrival airport during an arrival time range, predicted weather information for the arrival airport during the arrival time range, and facilities data for the arrival airport. For example, the airport taxi duration predictor 138 of FIG. 1 receives the flight plans 216 for the second plurality of aircraft (indicated by the aircraft identifiers 290) expected to arrive at or depart from the arrival airport (indicated by the arrival airport identifier 172) during the time range 288, as described with reference to FIG. 2. The airport taxi duration predictor 138 also receives the facilities data for the arrival airport. The facilities data includes data about any runways, taxiways, gates, or other facilities that are out of service, or are scheduled to be taken out of service or put back in service, at the arrival airport.

The method 800 includes generating, based on the arrival input data, one or more arrival sets for the aircraft, at 810. Each arrival set includes at least a predicted gate arrival time for the aircraft at an arrival gate using a particular runway and a probability associated with the aircraft using the particular runway. Each arrival set can also include an estimated taxi time from the runway to the gate.

The method 800 includes generating, based on at least one of the departure sets, at least one of the arrival sets, or both, an output, at 812. The method 800 also includes sending the output to a display device of display, at 814. The output can include estimated fuel usage for the flight, a predicted gate arrival time, next flight information for the aircraft or combinations thereof. A presented value of the output can be a single value, a highest reasonable value or a lowest reasonable value (e.g., departure sets or arrival sets with a runway probability below a threshold are not used to determine values since use of these sets would not be reasonable even if such sets would lead to a highest value or lowest value), can be a most likely value (e.g., departure sets, arrival sets, or both, with the highest runway probabilities are used to determine values), can include information indicating likely ranges from the most likely value or another value, or combinations thereof.

The output can also include one or more selectable options that can be selected to perform one or more tasks. For example, when the aircraft is at the departure airport, the output can include an estimated amount of fuel to load on the aircraft based on the estimated fuel usage (e.g., a particular percentage above the estimated fuel usage) and the output can include an accept indicator and a change indicator. If a person selects the accept indicator, the value of fuel to load is provided to a fuel service system that provides the amount of fuel to be loaded to a ground crew that handles fueling of the aircraft. If the change indicator is selected, a person can enter a different value for the fuel to be loaded, which can be checked to make sure that the amount of fuel is sufficient to make the flight based on the estimated fuel usage; and when the value is acceptable, the value is provided to the fuel service system.

The output can include a predicted gate arrival time from at least one of the one or more arrival sets. The output can also include information regarding a next flight for the aircraft and selectable options associated with a next flight for the aircraft. For example, if the estimated arrival at the gate is early or on schedule, the output can present the arrival time and the scheduled time for the next flight; but if the estimated arrival at the gate is past a scheduled arrival time by more than a threshold delay time, the output can present the estimated arrival time, the estimated delay relative to the scheduled arrival time, an estimated time for the next flight of the aircraft, a flight schedule for the aircraft, a list of available aircraft that can switch schedules with the aircraft, a selectable option to take no action based on the estimated arrival, selectable options for the next flight, or combinations thereof. The selectable option to take no action based on the estimated arrival and the selectable options for the next flight can include a recommended option that is determined by the device 102 to be a best option based on available information. The recommended option can be emphasized (e.g., bolded, underlined, presented in a particular color, highlighted, etc.).

The selectable options for the next flight can include a selectable option to delay the next flight (e.g., by the estimated delay relative to the scheduled arrival time or by a different amount of time (e.g., by the estimated delay rounded to the next closest quarter hour or by a time input by an authorized person)), a selectable option to cancel the next flight (e.g., when a delay time based on the predicted gate arrival time and a scheduled arrival time satisfy a delay threshold), and a selectable option to swap a schedule of the aircraft with the schedule of an aircraft from the list of available aircraft, which is referred to as a "tail swap." When a particular selectable option is selected, data to implement the particular selected option is provided to one or more systems that implement the particular selected option. The one or more appropriate systems includes a system to update posted estimated arrival times and estimated departure times for aircraft at the destination airport.

Actual arrival data for the flight is collected. The actual arrival data for the flight together with one or more of the arrival sets can be used as training data for the flight data model trainer 136 of FIG. 1.

The method 800 can be performed periodically during the flight of the aircraft to the destination airport. A portion of the output (e.g., the estimated gate arrival time for the aircraft and an estimated next flight time based on the estimated gate arrival time) can be provided to an information system that updates estimated arrival times and departure times for the destination airport. In addition, the output or a portion of the output can be provided to personnel associated with the aircraft if the estimated arrival time of the aircraft is past the scheduled arrival time of the aircraft. The output or the portion of the output is used by the personnel associated with the aircraft to determine how to handle a next scheduled flight of the aircraft from the destination airport. In some implementations, how to handle the next scheduled flight is handled automatically without input from the personnel associated with the aircraft.

The method 800 enables determination of predicted fuel usage. In addition, the method 800 provides information about gate arrival times for aircraft at destination airports. The predictions of gate arrival times are based on information from the destination airport, information from weather services, information from other aircraft, information from other sources, or combinations thereof, and are more accurate than arrival times based on taxi times determined from pilot experience or fixed average values for an airport. The gate arrival times are used to determine whether a next flight of an aircraft should be canceled, should be delayed, or whether the flight schedule of the aircraft should be swapped with the flight schedule of a different aircraft.

Figure 9:
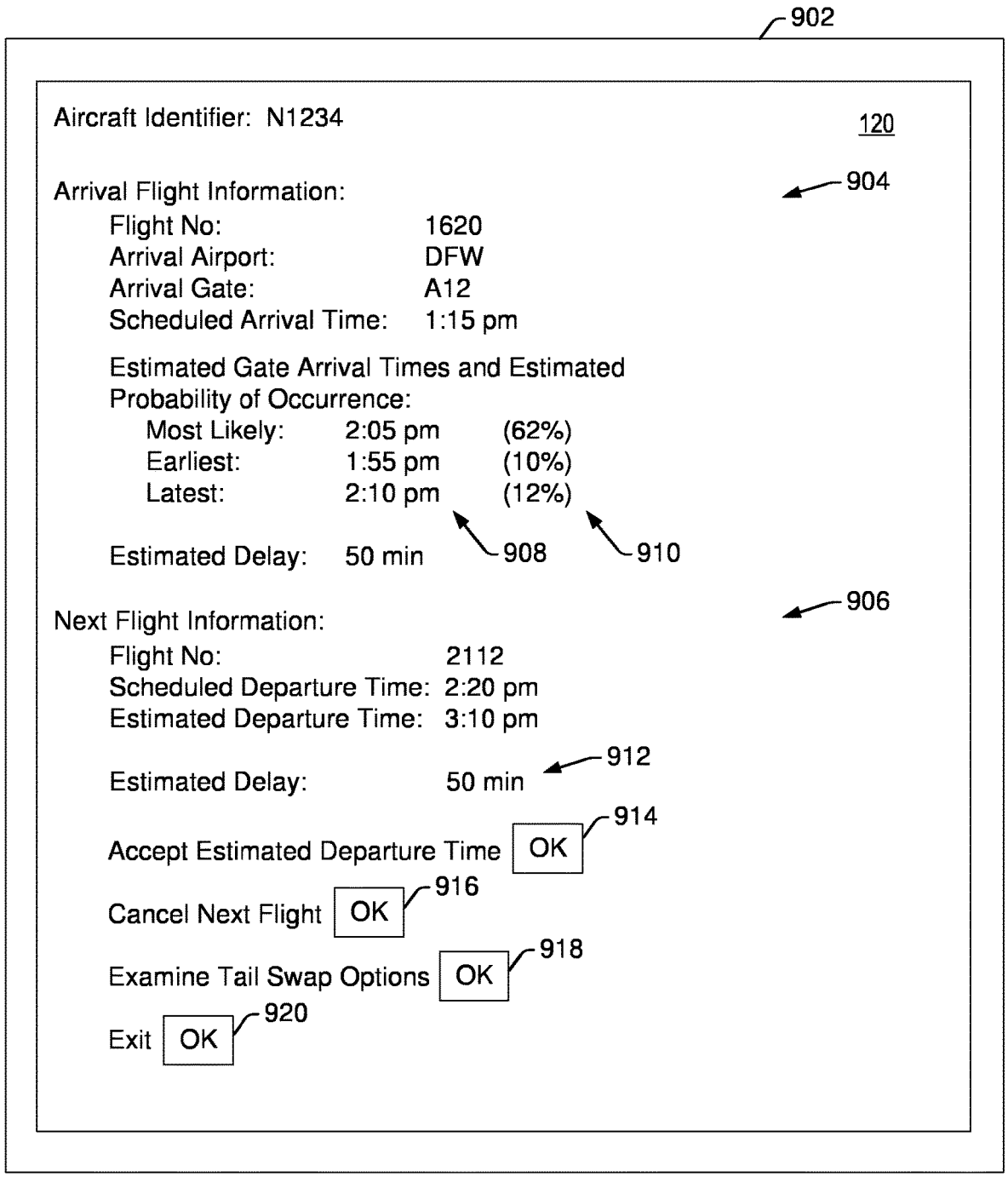
FIG. 9 is a diagram of another example of a user interface of a system configured to predict flight data.

Referring to FIG. 9, an example of a user interface presenting particular output 120 resulting from flight data prediction for a flight of an aircraft is shown. In a particular aspect, the particular output 120 is generated by the flight data predictor 134, the airport taxi duration predictor 138, the processor 180, the device 102, the EFB device 140, the system 100 of FIG. 1, the system 200 of FIG. 2, the system 500 of FIG. 5, the system 600 of FIG. 6, or a combination thereof, and is displayed by a display device 902.

The particular output 120 includes an aircraft identifier of the aircraft, arrival flight information 904, and next flight information 906. The arrival flight information 904 can include one or more estimated gate arrival times 908 and probabilities 910 of occurrence (e.g., a probability that the aircraft will use a particular runway that will result in the estimated gate arrival time).

The next flight information 906 includes an estimated delay 912 associated with the next flight when there is expected to be a delay with the next flight. The next flight information 906 includes a selectable option 914 to accept a presented estimated departure time. Selection of the selectable option 914 results in a scheduling system receiving the estimated departure time. The next flight information 906 includes a selectable option 916 to cancel the next flight. Selection of the selectable option 916 results in informing the scheduling system of the cancellation. Selection of the selectable option 916 can also result in the scheduling system informing appropriate personnel of the cancellation and initiating remediation actions associated with cancellation of the next flight.

The next flight information 906 can also include a selectable option 918 to examine tail swap options. The aircraft is associated with an airline. When the estimated delay for the next flight is greater than a threshold, flight plans for other aircraft associated with the airline (e.g., aircraft that are at the airport or are due to arrive at the airport) are analyzed to determine whether one or more schedules of the other aircraft can be swapped with the aircraft to eliminate or reduce the estimated delay for the next flight. When there are no aircraft associated with the airline that could be used for a tail swap, no information regarding tail swap options is presented or text indicating that there are no tail swap options is presented. Lack of tail swap options can be a factor that influences selection of the selectable option 916 corresponding to cancellation of the next flight. When there are one or more other aircraft associated with the airline that could be used for a tail swap, selectable option 918 and corresponding text are displayed. When the selectable option 918 is selected, information about each aircraft that could be used for the tail swap is presented and one or more additional selectable options for initiating performance of the tail swap are presented.

The next flight information can also include a selectable option 920 associated with exiting from the display of the output 120. Selection of the selectable option 920 exits the display without sending the next flight information 906 to another system or otherwise using the next flight information 906.

Figure 10:
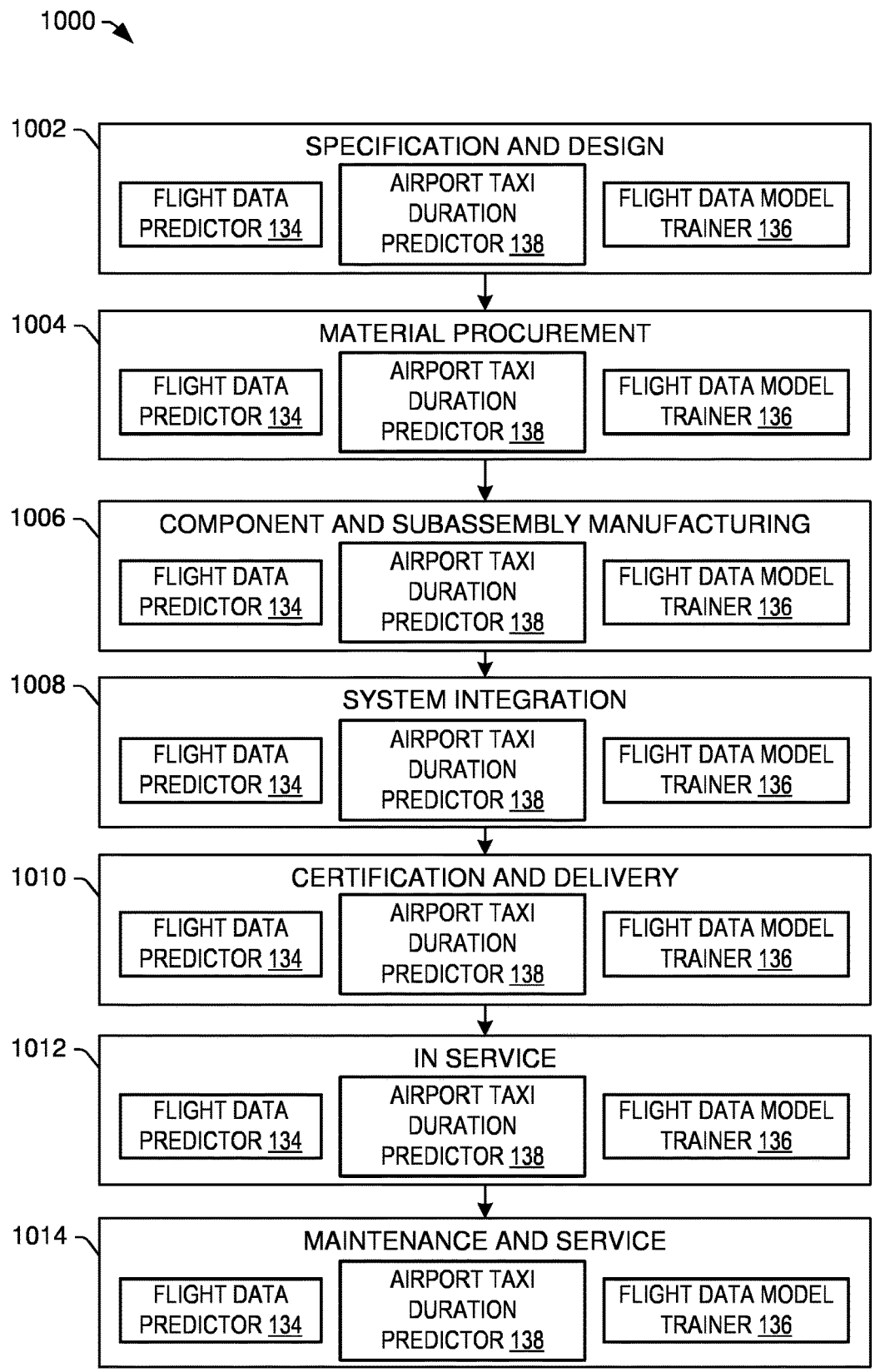
FIG. 10 is a flow chart illustrating a life cycle of an aircraft that includes a flight data predictor, an airport taxi duration predictor, a flight data model trainer of FIG. 1, or a combination thereof.

Referring to FIG. 10, a flowchart illustrative of a life cycle of an aircraft that is configured to predict flight data is shown and designated 1000. During pre-production, the exemplary method 1000 includes, at 1002, specification and design of an aircraft, such as the aircraft 1100 described with reference to FIG. 11. During specification and design of the aircraft, the method 1000 may include specification and design of a flight data prediction system. The flight data prediction system includes the flight data predictor 134, the airport taxi duration predictor 138, the flight data model trainer 136, or a combination thereof. At 1004, the method 1000 includes material procurement, which may include procuring materials for the flight data prediction system.

During production, the method 1000 includes, at 1006, component and subassembly manufacturing and, at 1008, system integration of the aircraft. For example, the method 1000 may include component and subassembly manufacturing of the flight data prediction system and system integration of the flight data prediction system. At 1010, the method 1000 includes certification and delivery of the aircraft and, at 1012, placing the aircraft in service. Certification and delivery may include certification of the flight data prediction system to place the flight data prediction system in service. While in service by a customer, the aircraft may be scheduled for routine maintenance and service (which may also include modification, reconfiguration, refurbishment, and so on). At 1014, the method 1000 includes performing maintenance and service on the aircraft, which may include performing maintenance and service on the flight data prediction system.

Each of the processes of the method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 1100 as shown in FIG. 11.

Figure 11:
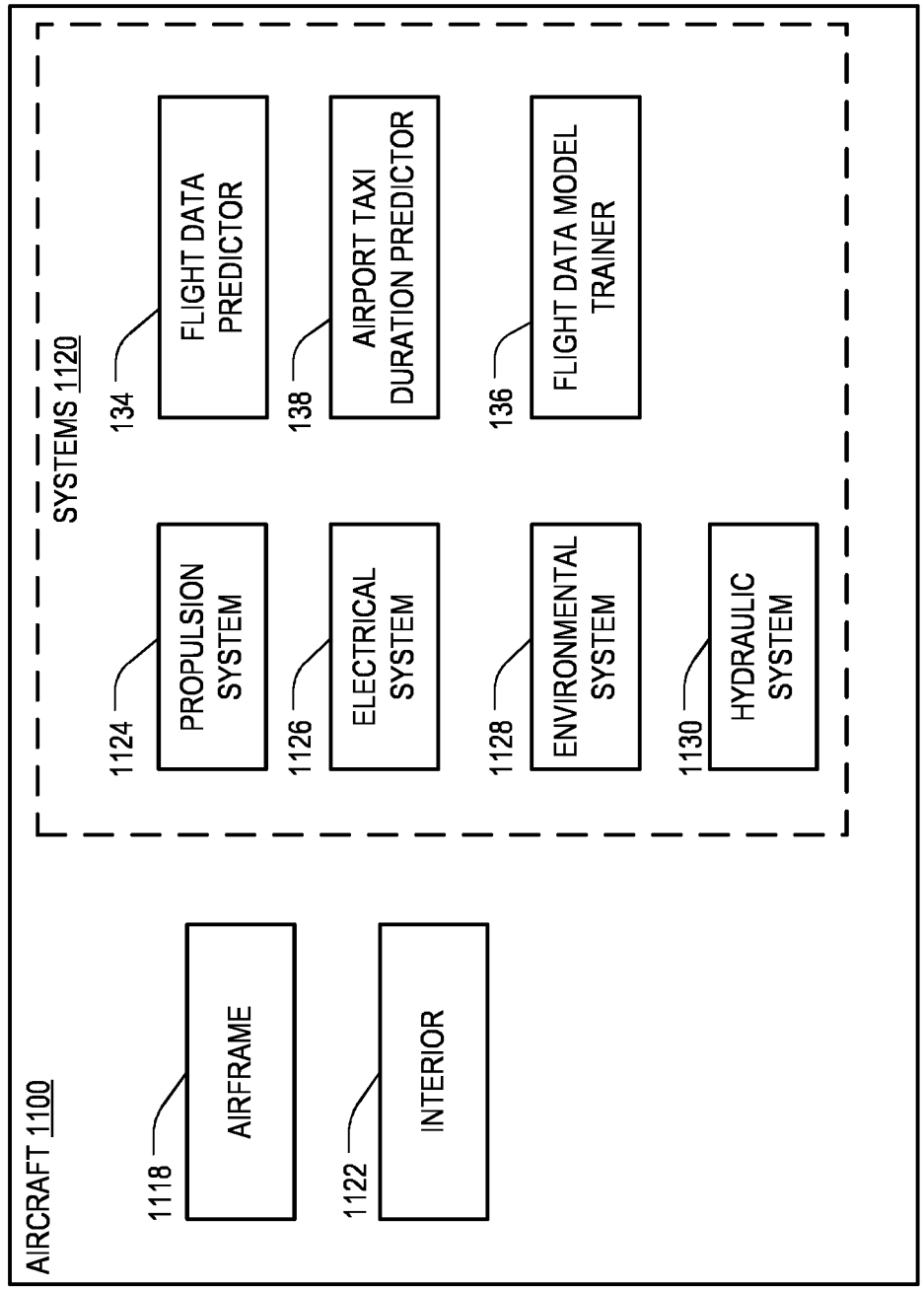
FIG. 11 is a diagram of an aircraft configured to predict flight data.

In the example of FIG. 11, the aircraft 1100 includes an airframe 1118 with a plurality of systems 1120 and an interior 1122. Examples of the plurality of systems 1120 include one or more of a propulsion system 1124, an electrical system 1126, an environmental system 1128, and a hydraulic system 1130. Any number of other systems may be included, such as the flight data predictor 134, the airport taxi duration predictor 138, the flight data model trainer 136, or a combination thereof.

Figure 12:
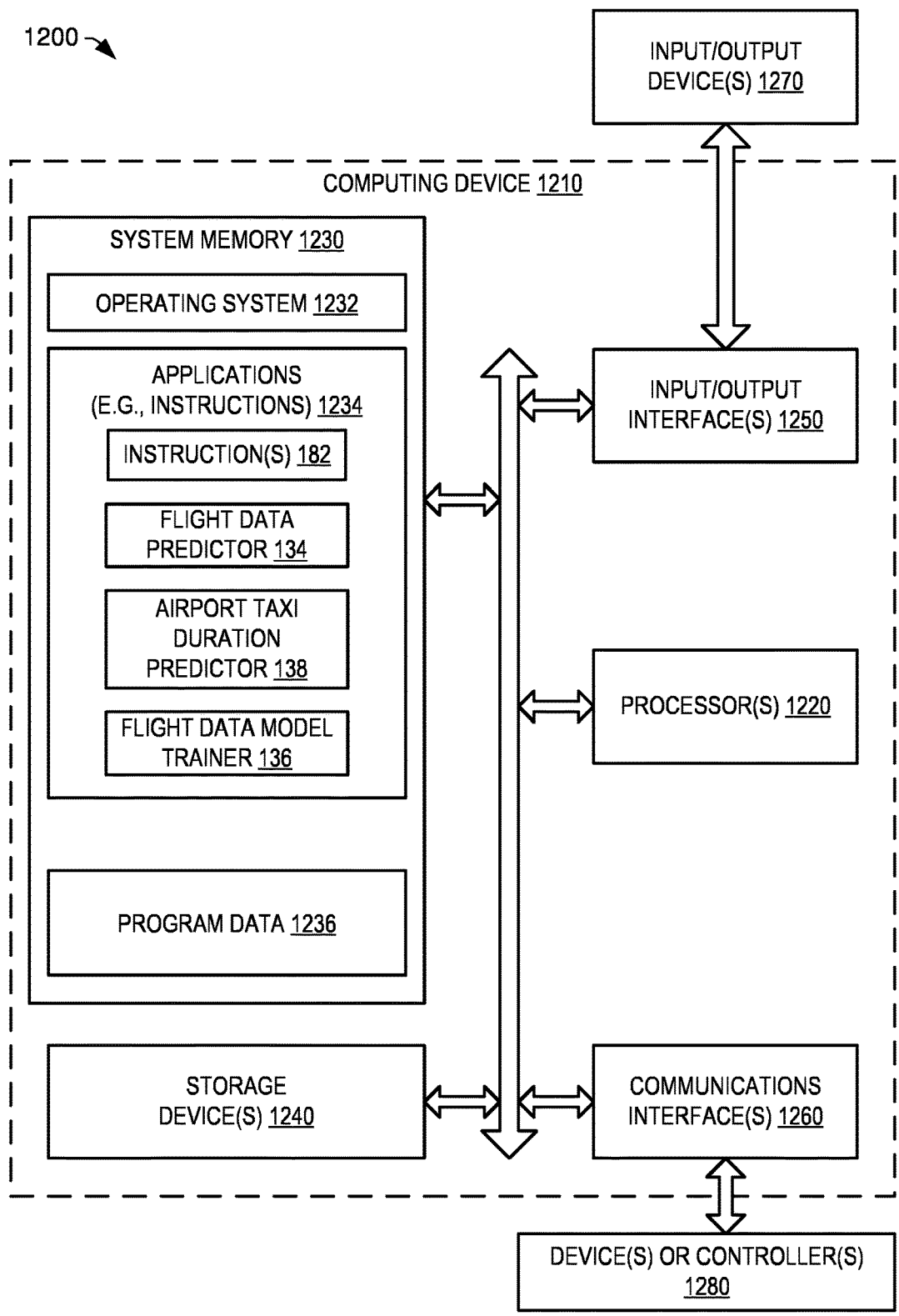
FIG. 12 is a block diagram of a computing environment including a computing device configured to support aspects of computer-implemented methods and computer-executable program instructions (or code) according to the present disclosure.

FIG. 12 is a block diagram of a computing environment 121200 including a computing device 1210 configured to support aspects of computer-implemented methods and computer-executable program instructions (or code) according to the present disclosure. For example, the computing device 1210, or portions thereof, is configured to execute instructions to initiate, perform, or control one or more operations described with reference to FIGS. 1-11. In a particular aspect, the computing device 1210 includes the device 102, the electronic flight bag device 140 of FIG. 1, one or more servers, one or more virtual devices, or a combination thereof.

The computing device 1210 includes one or more processors 1220. In a particular aspect, the processor 1220 corresponds to the processor 180 of FIG. 1. The processor 1220 is configured to communicate with system memory 1230, one or more storage devices 1240, one or more input/output interfaces 1250, one or more communications interfaces 1260, or any combination thereof. The system memory 1230 includes volatile memory devices (e.g., random access memory (RAM) devices), nonvolatile memory devices (e.g., read-only memory (ROM) devices, programmable read-only memory, and flash memory), or both. The system memory 1230 stores an operating system 1232, which may include a basic input/output system for booting the computing device 1210 as well as a full operating system to enable the computing device 1210 to interact with users, other programs, and other devices. The system memory 1230 stores system (program) data 1236, such as the predicted flight data 122, the departure input data 144, the arrival input data 146, the flight plan 150, the arrival airport historical data 192, the departure airport historical data 190, the departure airport taxi duration data model 196, the arrival airport taxi duration data model 198, the aircraft performance data 128, the aircraft specifications 168, the detected departure taxi duration 156, the detected arrival taxi duration 152, the flight identifier 186, the output 120 of FIG. 1, the airport taxi duration data model 230, the airport historical data 258, the time range 288, the aircraft identifiers 290, the input data 224, the airport runway direction data 276, the airport map 278, the airport weather forecast 226, the airport weather conditions 252, the flight plans 216, the aircraft location data 214, the predicted taxi duration 264 of FIG. 2, the user interface 300 of FIG. 3, or a combination thereof.

The system memory 1230 includes one or more applications 1234 (e.g., sets of instructions) executable by the processor(s) 1220. As an example, the one or more applications 1234 include the instructions 182 executable by the processor(s) 1220 to initiate, control, or perform one or more operations described with reference to FIGS. 1-11. To illustrate, the one or more applications 1234 include the instructions 182 executable by the processor(s) 1220 to initiate, control, or perform one or more operations described with reference to the flight data predictor 134, the airport taxi duration predictor 138, the flight data model trainer 136, or a combination thereof.

In a particular implementation, the system memory 1230 includes a non-transitory, computer readable medium (e.g., a computer-readable storage device) storing the instructions 182 that, when executed by the processor(s) 1220, cause the processor(s) 1220 to initiate, perform, or control operations to predict flight data. The operations include receiving flight plans for a plurality of aircraft expected to arrive at or depart from a departure airport during a particular time range. The operations also include predicting, based on the flight plans and a departure airport map, a taxi duration or a fuel usage of a first aircraft of the plurality of aircraft. The operations further include generating an output based on the taxi duration or the fuel usage. In a particular aspect, the operations include receiving flight plans for a plurality of aircraft expected to arrive at or depart from an arrival airport during a particular time range. The operations also include predicting, based on the flight plans and an arrival airport map, a taxi duration, a fuel usage of a first aircraft of the plurality of aircraft, a gate arrival time at the arrival airport, or combinations thereof. The operations further include generating an output based on the taxi duration, the fuel usage, gate arrival time, or combinations thereof.

In a particular implementation, a method for flight data prediction includes receiving, at a device, flight plans for a plurality of aircraft expected to arrive at or depart from a departure airport during a particular time range. The method also includes predicting, based on the flight plans and a departure airport map, a taxi duration or a fuel usage of a first aircraft of the plurality of aircraft. The method further includes generating, at the device, an output based on the taxi duration or the fuel usage.

The one or more storage devices 1240 include nonvolatile storage devices, such as magnetic disks, optical disks, or flash memory devices. In a particular example, the storage devices 1240 include both removable and non-removable memory devices. The storage devices 1240 are configured to store an operating system, images of operating systems, applications (e.g., one or more of the applications 1234), and program data (e.g., the program data 1236). In a particular aspect, the system memory 1230, the storage devices 1240, or both, include tangible computer-readable media. In a particular aspect, one or more of the storage devices 1240 are external to the computing device 1210.

The one or more input/output interfaces 1250 that enable the computing device 1210 to communicate with one or more input/output devices 1270 to facilitate user interaction. For example, the one or more input/output interfaces 1250 can include a display interface, an input interface, or both. For example, the input/output interface 1250 is adapted to receive input from a user, to receive input from another computing device, or a combination thereof. In some implementations, the input/output interface 1250 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1270 includes one or more user interface devices and displays, including some combination of buttons, keyboards, pointing devices, displays, speakers, microphones, touch screens, and other devices. In a particular aspect, the input/output devices 1270 include the display device 502 of FIG. 5.

The processor(s) 1220 are configured to communicate with devices or controllers 1280 via the one or more communications interfaces 1260. For example, the one or more communications interfaces 1260 can include a network interface. The devices or controllers 1280 can include, for example, the flight information system 142, the aircraft information system 162, the electronic flight bag device 140, the device 102 of FIG. 1, the airport information system 246, the weather information system 238 of FIG. 2, one or more other devices, or any combination thereof.

Furthermore, the present disclosure comprises examples according to the following clauses:

Clause 1. A device (102) for flight data prediction of a flight of an aircraft, the device comprising: one or more communication interfaces (1060) configured to receive arrival input data (146), the arrival input data comprising flight plans (216) for a plurality of aircraft expected to arrive at or depart from an arrival airport during an arrival time range, predicted weather information (226) for the arrival airport during the arrival time range, and facilities data (276, 278) for the arrival airport; and one or more processors (180) configured to: generate, based on the arrival input data, one or more arrival sets (169) for the aircraft, each arrival set comprising a predicted gate arrival time (908) for the aircraft at an arrival gate using a particular runway and a probability (910) associated with the aircraft using the particular runway; and generate an output (120) based on at least one of the one or more arrival sets.

Clause 2. The device of clause 1, wherein the output indicates the predicted gate arrival time for at least one of the one or more arrival sets.

Clause 3. The device of clauses 1 or 2, wherein the output comprises a selectable option (916) to cancel a next flight for the aircraft.

Clause 4. The device of any of clauses 1 to 3, wherein the output comprises information indicating a delay (912) associated with one or more subsequent flights for the aircraft.

Clause 5. The device of any of clauses 1 to 4, wherein the output comprises a selectable option (918) associated with performing a swap of a schedule for the aircraft with a schedule for a second aircraft.

Clause 6. The device of any of clauses 1 to 5, wherein the output comprises information indicating predicted fuel usage (118) by the aircraft for the flight.

Clause 7. The device of clauses 6, wherein the output is generated based on historical aircraft performance data for the aircraft (128), specifications for the aircraft (168), one or more departure sets (167) for the aircraft, or combinations thereof, wherein each departure set comprises a predicted time from leaving a departure gate to take-off of the aircraft.

Clause 8. The device of any of clauses 1 to 7, wherein the facilities data for the arrival airport comprises information regarding runways; taxiways associated with the runways; gates available for use by the aircraft; status information for the runways, taxiways, and gates; or combinations thereof.

Clause 9. The device of any of clauses 1 to 8, wherein the one or more processors use a data model (134) trained based on historical data (192) associated with the arrival airport to generate the one or more arrival sets.

Clause 10. The device of any of clauses 1 to 9, wherein the one or more processors are components of an electronic flight bag (140) or a server (1210).

Clause 11. A method (800) of flight data prediction for an aircraft, the method comprising: receiving (808), at a device (102), arrival input data (146) for a flight of the aircraft to an arrival airport, the arrival input data comprising flight plans (216) for a plurality of aircraft expected to arrive at or depart from the arrival airport during an arrival time range, predicted weather information (226) for the arrival airport during the arrival time range, and facilities data (276, 278) for the arrival airport; generating (806), at the device based on the arrival input data, one or more arrival sets (169) for the aircraft, each arrival set comprising a predicted gate arrival time (909) for the aircraft at an arrival gate using a particular runway and a probability (910) associated with the aircraft using the particular runway; and generating (812), at the device, an output (120) based on at least one of the one or more arrival sets.

Clause 12. The method of clause 11, further comprising receiving (804), at the device before initiation of the flight of the aircraft to the arrival airport, departure input data (144) for a departure airport for the flight, the departure input data comprising flight plans for a plurality of aircraft expected to arrive at or depart from the departure airport during a departure time range, predicted weather information for the departure airport during the departure time range, facilities data for the departure airport, wherein the one or more arrival sets for the aircraft are based on one or more departure sets (167) for the aircraft, each departure set comprising a take-off time of the aircraft from a particular runway and a probability associated with the aircraft using the particular runway.

Clause 13. The method of clause 12, wherein the output indicates a predicted fuel usage (118) by the aircraft for the flight from a predicted departure gate to a predicted arrival gate.

Clause 14. The method of any of clauses 11 to 13, wherein the output comprises information (906) associated with a next flight of the aircraft.

Clause 15. The method of any of clauses 11 to 14, wherein the output enables cancellation (916) of a next flight of the aircraft.

Clause 16. The method of any of clauses 11 to 15, wherein the output comprises information indicating no change associated with a next flight or a delay time (912) associated with the next flight.

Clause 17. The method of any of clauses 11 to 16, wherein the output comprises information (918) associated with swapping flight schedules flight with a second aircraft.

Clause 18. The method of any of clauses 11 to 17, wherein the device is configured to generate the output before the flight, during the flight, or both.

Clause 19. A computer-readable storage device (1230) storing instructions that, when executed by one or more processors (1220), cause the one or more processors to perform operations comprising: receiving arrival input data for a flight of an aircraft to an arrival airport, the arrival input data comprising flight plans for a plurality of aircraft expected to arrive at or depart from an arrival airport during an arrival time range, predicted weather information for the arrival airport during the arrival time range, and facilities data for the arrival airport; generating, based on the arrival input data, one or more arrival sets for the aircraft, each arrival set comprising a predicted gate arrival time for the aircraft at an arrival gate using a particular runway and a probability associated with the aircraft using the particular runway; and generating an output based on at least one of the one or more arrival sets.

Clause 20. The computer-readable storage device of clause 19, wherein the operations further comprise sending the output to a display device or an electronic flight bag device.

In some implementations, a non-transitory, computer readable medium (e.g., a computer-readable storage device) stores instructions that, when executed by one or more processors, cause the one or more processors to initiate, perform, or control operations to perform part or all of the functionality described above. For example, the instructions may be executable to implement one or more of the operations or methods of FIGS. 1-11. In some implementations, part or all of one or more of the operations or methods of FIGS. 1-11 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for flight data prediction of a flight of an aircraft, the device comprising:
one or more communication interfaces configured to receive arrival input data, the arrival input data comprising flight plans for a plurality of aircraft expected to arrive at or depart from an arrival airport during an arrival time range, predicted weather information for the arrival airport during the arrival time range, and facilities data for the arrival airport; and
one or more processors configured to:
generate, based on the arrival input data, a plurality of arrival sets for the aircraft at the arrival airport during the arrival time range, each arrival set comprising a predicted gate arrival time for the aircraft at an arrival gate using a particular runway and a probability associated with the aircraft using the particular runway and arriving at the predicted gate arrival time, wherein a first arrival set of the plurality of arrival sets comprises a first predicted gate arrival time, wherein a second arrival set of the plurality of arrival sets comprises a second predicted gate arrival time, and wherein the first predicted gate arrival time is distinct from the second predicted gate arrival time; and
generate an output based on at least one of the plurality of arrival sets.

2. The device of claim 1, wherein the output indicates the predicted gate arrival time for at least one of the plurality of arrival sets.

3. The device of claim 1, wherein the output comprises a selectable option to cancel a next flight for the aircraft.

4. The device of claim 1, wherein the output comprises information indicating a delay associated with one or more subsequent flights for the aircraft.

5. The device of claim 1, wherein the output comprises a selectable option associated with performing a swap of a schedule for the aircraft with a schedule for a second aircraft.

6. The device of claim 1, wherein the output comprises information indicating predicted fuel usage by the aircraft for the flight.

7. The device of claim 6, wherein the output is generated based on historical aircraft performance data for the aircraft, specifications for the aircraft, one or more departure sets for the aircraft, or combinations thereof, wherein each departure set comprises a predicted time from leaving a departure gate to take-off of the aircraft.

8. The device of claim 1, wherein the facilities data for the arrival airport comprises information regarding runways; taxiways associated with the runways; gates available for use by the aircraft; status information for the runways, taxiways, and gates; or combinations thereof.

9. The device of claim 1, wherein the one or more processors use a data model trained based on historical data associated with the arrival airport to generate the plurality of arrival sets.

10. The device of claim 1, wherein the one or more processors are components of an electronic flight bag or a server.

11. A method of flight data prediction for an aircraft, the method comprising:
receiving, at a device, arrival input data for a flight of the aircraft to an arrival airport, the arrival input data comprising flight plans for a plurality of aircraft expected to arrive at or depart from the arrival airport during an arrival time range, predicted weather information for the arrival airport during the arrival time range, and facilities data for the arrival airport;
generating, at the device based on the arrival input data, a plurality of arrival sets for the aircraft at the arrival airport during the arrival time range, each arrival set comprising a predicted gate arrival time for the aircraft at an arrival gate using a particular runway and a probability associated with the aircraft using the particular runway and arriving at the predicted gate arrival time, wherein a first arrival set of the plurality of arrival sets comprises a first predicted gate arrival time, wherein a second arrival set of the plurality of arrival sets comprises a second predicted gate arrival time, and wherein the first predicted gate arrival time is distinct from the second predicted gate arrival time; and
generating, at the device, an output based on at least one of the plurality of arrival sets.

12. The method of claim 11, further comprising receiving, at the device before initiation of the flight of the aircraft to the arrival airport, departure input data for a departure airport for the flight, the departure input data comprising flight plans for a plurality of aircraft expected to arrive at or depart from the departure airport during a departure time range, predicted weather information for the departure airport during the departure time range, facilities data for the departure airport, wherein the plurality of arrival sets for the aircraft are based on one or more departure sets for the aircraft, each departure set comprising a take-off time of the aircraft from a particular runway and a probability associated with the aircraft using the particular runway.

13. The method of claim 12, wherein the output indicates a predicted fuel usage by the aircraft for the flight from a predicted departure gate to a predicted arrival gate.

14. The method of claim 11, wherein the output comprises information associated with a next flight of the aircraft.

15. The method of claim 11, wherein the output enables cancellation of a next flight of the aircraft.

16. The method of claim 11, wherein the output comprises information indicating no change associated with a next flight or a delay time associated with the next flight.

17. The method of claim 11, wherein the output comprises information associated with swapping flight schedules flight with a second aircraft.

18. The method of claim 11, wherein the device is configured to generate the output before the flight, during the flight, or both.

19. A computer-readable storage device storing instructions that, when executed by one or more processors, cause the one or more processors to perform operations comprising:
receiving arrival input data for a flight of an aircraft to an arrival airport, the arrival input data comprising flight plans for a plurality of aircraft expected to arrive at or depart from an arrival airport during an arrival time range, predicted weather information for the arrival airport during the arrival time range, and facilities data for the arrival airport;
generating, based on the arrival input data, a plurality of arrival sets for the aircraft at the arrival airport during the arrival time range, each arrival set comprising a predicted gate arrival time for the aircraft at an arrival gate using a particular runway and a probability associated with the aircraft using the particular runway and arriving at the predicted gate arrival time, wherein a first arrival set of the plurality of arrival sets comprises a first predicted gate arrival time, wherein a second arrival set of the plurality of arrival sets comprises a second predicted gate arrival time, and wherein the first predicted gate arrival time is distinct from the second predicted gate arrival time; and
generating an output based on at least one of the plurality of arrival sets.

20. The computer-readable storage device of claim 19, wherein the operations further comprise sending the output to a display device or an electronic flight bag device.

\* \* \* \* \*